United States Patent
Hirata et al.

(10) Patent No.: US 8,072,706 B2
(45) Date of Patent: Dec. 6, 2011

(54) MAGNETIC HEAD FOR PERPENDICULAR MAGNETIC RECORDING AND METHOD OF MANUFACTURING SAME

(75) Inventors: Kei Hirata, Tokyo (JP); Hideyuki Ukita, Tokyo (JP); Shin Narushima, Tokyo (JP); Isamu Toba, Tokyo (JP); Hiromichi Umehara, Tokyo (JP); Hisayoshi Watanabe, Tokyo (JP); Hideyuki Yatsu, Tokyo (JP)

(73) Assignee: TDK Corporation, Tokyo (JP)

( * ) Notice: Subject to any disclaimer, the term of this patent is extended or adjusted under 35 U.S.C. 154(b) by 281 days.

(21) Appl. No.: 12/588,440

(22) Filed: Oct. 15, 2009

(65) Prior Publication Data

US 2011/0090595 A1    Apr. 21, 2011

(51) Int. Cl.
*G11B 5/127* (2006.01)
(52) U.S. Cl. .................................. 360/125.07
(58) Field of Classification Search .......... 360/125.07, 360/125.06, 125.08, 125.13, 125.03, 125.31, 360/125.3; 29/603.07, 603.15
See application file for complete search history.

(56) References Cited

U.S. PATENT DOCUMENTS

| | | | |
|---|---|---|---|
| 4,858,048 A * | 8/1989 | Hayakawa et al. | 360/121 |
| 2008/0239567 A1 | 10/2008 | Sasaki et al. | |
| 2009/0002884 A1 | 1/2009 | Sasaki et al. | |
| 2011/0086182 A1 * | 4/2011 | Matono et al. | 427/553 |

* cited by examiner

*Primary Examiner* — Allen Cao
(74) *Attorney, Agent, or Firm* — Oliff & Berridge, PLC

(57) ABSTRACT

A main magnetic pole includes a first part extending from a medium facing surface to a point at a predetermined distance from the medium facing surface, and a second part other than the first part. An accommodation part for accommodating the main magnetic pole includes: a first layer having a groove; a second layer lying between the first layer and the main magnetic pole in the first layer's groove; and a third layer interposed in part between the second layer and the main magnetic pole in the first layer's groove. The second layer is formed of a metal material different from a material used to form the first layer. The third layer is formed of an inorganic insulating material. The second and third layers lie between the first layer and the first part. The second layer lies between the bottom of the first layer's groove and the second part, but the third layer does not. The distance between the bottom of the first layer's groove and the second part is smaller than that between the bottom and the first part.

24 Claims, 27 Drawing Sheets

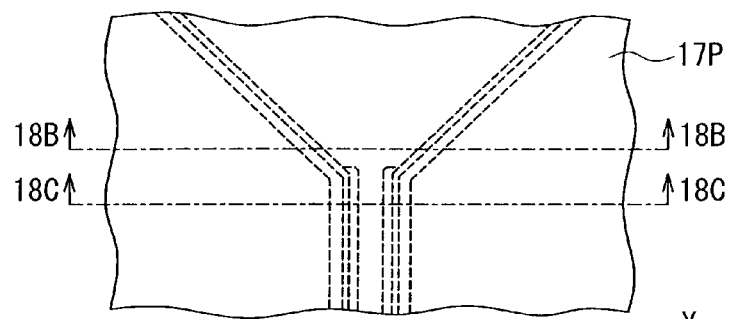
FIG. 18A
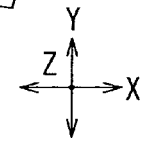
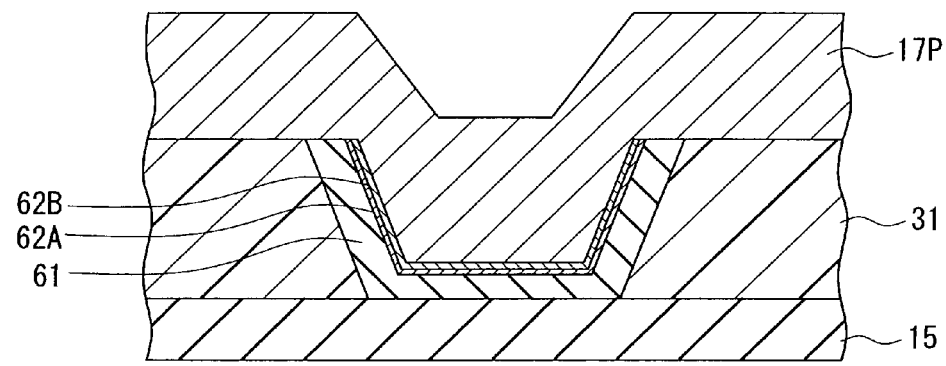
FIG. 18B
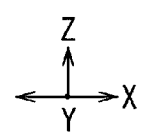
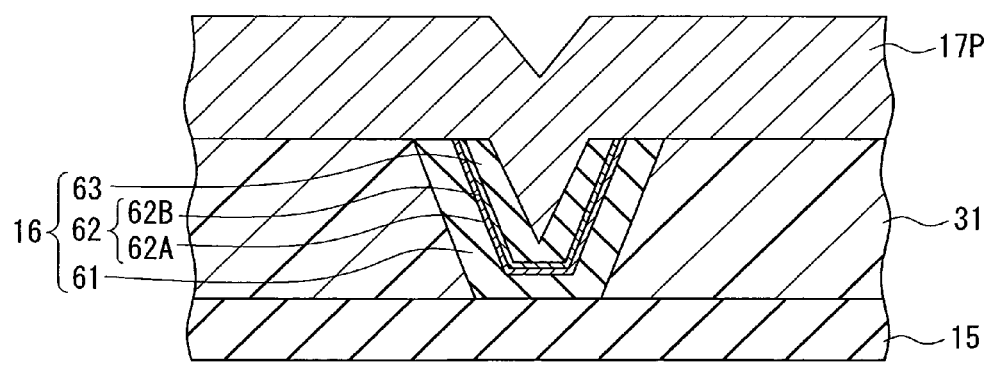
FIG. 18C
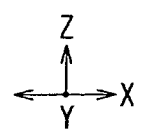

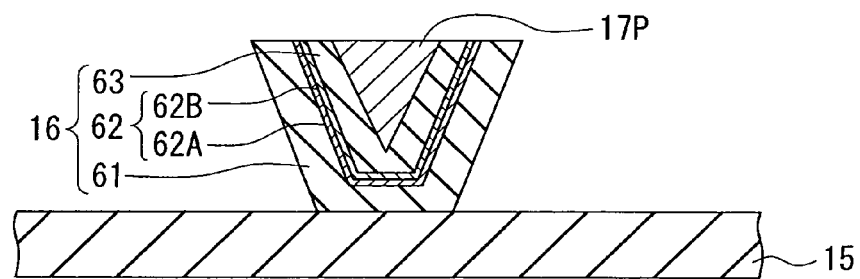
FIG. 20
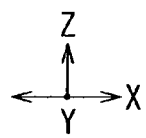
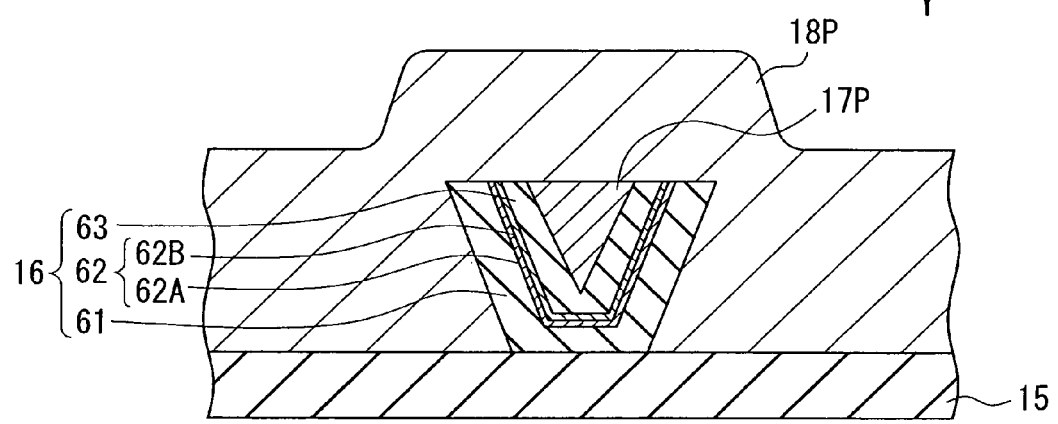
FIG. 21
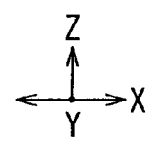
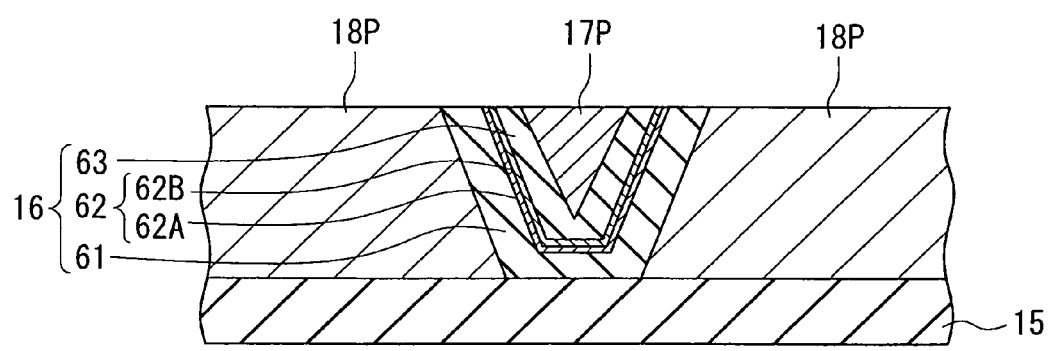
FIG. 22
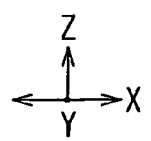

MAGNETIC HEAD FOR PERPENDICULAR MAGNETIC RECORDING AND METHOD OF MANUFACTURING SAME

BACKGROUND OF THE INVENTION

1. Field of the Invention

The present invention relates to a magnetic head for perpendicular magnetic recording that is used for recording data on a recording medium by means of a perpendicular magnetic recording system, a method of manufacturing the same, and a head assembly and a magnetic recording device each of which includes the magnetic head for perpendicular magnetic recording.

2. Description of the Related Art

Recently, magnetic recording devices such as a magnetic disk drive have been improved in recording density, and magnetic heads and magnetic recording media of improved performance have been demanded accordingly. The recording systems of magnetic recording devices include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. As compared with the longitudinal magnetic recording system, the perpendicular magnetic recording system is harder to be affected by thermal fluctuation of the recording medium and capable of providing higher linear recording density.

Magnetic heads for perpendicular magnetic recording typically have, as do magnetic heads for longitudinal magnetic recording, a structure in which a reproducing head including a magnetoresistive element (hereinafter, also referred to as an MR element) for reading and a recording head including an induction-type electromagnetic transducer for writing are stacked on a substrate. The recording head includes a main magnetic pole that produces a magnetic field in the direction perpendicular to the plane of the recording medium. The main magnetic pole includes, for example, a track width defining portion having an end located in a medium facing surface that faces the recording medium, and a wide portion that is coupled to the other end of the track width defining portion and is greater in width than the track width defining portion. The track width defining portion has a nearly uniform width.

What is required of the recording head for achieving higher recording density is reduction in track width and improvement in recording characteristics, in particular. Reducing the track width leads to degradation of the recording characteristics, such as overwrite property which is a parameter indicating an overwriting capability. A further improvement in recording characteristics is therefore required as the track width is reduced.

A magnetic head for use in a magnetic disk drive is typically provided in a slider. The slider has the medium facing surface mentioned above. The medium facing surface has an air-inflow-side end and an air-outflow-side end. The slider is configured to slightly fly over the surface of the recording medium by means of an airflow that comes from the air-inflow-side end into the space between the medium facing surface and the recording medium. The magnetic head is typically disposed near the air-outflow-side end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In a magnetic disk drive of the perpendicular magnetic recording system, in particular, which exhibits a better capability of writing on a recording medium compared with the longitudinal magnetic recording system, the skew mentioned above can cause a phenomenon called adjacent track erase or wide-range adjacent track erase, that is, the phenomenon that signals already recorded on one or more tracks that are adjacent to a track targeted for recording are erased or attenuated when recording a signal on the track targeted for recording. Suppression of the adjacent track erase or wide-range adjacent track erase is required in order to achieve a higher recording density.

In order for a magnetic head for perpendicular magnetic recording to achieve reduction in track width and improvement in overwrite property at the same time, it is effective to increase the thickness of the main magnetic pole so as to increase the area of the cross section of the main magnetic pole perpendicular to the direction of flow of the magnetic flux. If the entire main magnetic pole is increased in thickness, however, the adjacent track erase or wide-range adjacent track erase becomes more likely to occur. This makes it difficult to increase the recording density.

U.S. Patent Application Publication No. 2008/0239567 A1 and U.S. Patent Application Publication No. 2009/0002884 A1 each describe a main magnetic pole that is configured to have a first part that extends from the medium facing surface to a point at a predetermined distance from the medium facing surface, and a second part that is other than the first part. The main magnetic pole changes in at least either one of width and thickness at the boundary between the first part and the second part so that the second part has a larger cross-sectional area than that of the first part. The main magnetic pole of such a configuration allows the suppression of adjacent track erase or wide-range adjacent track erase, and at the same time allows the improvement of overwrite property.

In general, there is a trade-off between the suppression of adjacent track erase or wide-range adjacent track erase and the improvement of overwrite property. If the main magnetic pole is configured to have the foregoing first and second parts, the shape of the main magnetic pole affects both the adjacent track erase or wide-range adjacent track erase and the overwrite property. More specifically, if the cross-sectional area of the second part increases too much as compared with that of the first part, the overwrite property can be improved but the adjacent track erase or wide-range adjacent track erase is more likely to occur. If, on the other hand, the cross-sectional area of the second part increases too little as compared with that of the first part, the adjacent track erase or wide-range adjacent track erase can be suppressed but the overwrite property cannot be improved. To achieve the suppression of adjacent track erase or wide-range adjacent track erase and the improvement of overwrite property at the same time, it is therefore necessary to precisely control the shape of the main magnetic pole.

It has conventionally been difficult, however, to precisely control the shape of the main magnetic pole when the main magnetic pole is configured to have the foregoing first and second parts.

OBJECT AND SUMMARY OF THE INVENTION

It is an object of the present invention to provide a magnetic head for perpendicular magnetic recording that makes it possible to accurately control the shape of the main magnetic pole for improved recording density and overwrite property, a method of manufacturing the same, and a head assembly and a magnetic recording device each of which includes the magnetic head for perpendicular magnetic recording.

A magnetic head for perpendicular magnetic recording according to the present invention includes: a medium facing surface that faces a recording medium; a coil that produces a magnetic field corresponding to data to be recorded on the recording medium; a main magnetic pole that has an end face located in the medium facing surface, allows a magnetic flux corresponding to the magnetic field produced by the coil to pass, and produces a recording magnetic field for recording the data on the recording medium by means of a perpendicular magnetic recording system; and an accommodation part having an accommodating groove that accommodates the main magnetic pole.

The main magnetic pole includes a first part that extends from the medium facing surface to a point at a predetermined distance from the medium facing surface, and a second part that is other than the first part. The accommodation part includes: a first layer that has a groove; a second layer that is located in the groove of the first layer so as to lie between the first layer and the main magnetic pole; and a third layer that is located in the groove of the first layer so as to be interposed in part between the second layer and the main magnetic pole. The groove of the first layer has a first wall face and a second wall face that are located on both sides of the main magnetic pole opposite to each other in a track width direction, and a bottom surface that connects the first and second wall faces to each other. The second layer is formed of a metal material different from a material used to form the first layer. The third layer is formed of an inorganic insulating material.

The second layer and the third layer lie between the first layer and the first part. The second layer lies between the bottom surface of the groove of the first layer and the second part, but the third layer does not lie between them. The distance between the bottom surface of the groove of the first layer and the second part is smaller than that between the bottom surface and the first part. The distance from the second part to each of the first and second wall faces of the groove of the first layer is smaller than that from the first part to each of the first and second wall faces. With such a configuration, the cross section of the second part perpendicular to the direction of flow of the magnetic flux has a larger area than that of the first part at the boundary between the first part and the second part. In the magnetic head for perpendicular magnetic recording according to the present invention, the inorganic insulating material used to form the third layer may be alumina.

In the magnetic head for perpendicular magnetic recording according to the present invention, the distance from the medium facing surface to the boundary between the first part and the second part may fall within a range of 2 to 50 nm.

In the magnetic head for perpendicular magnetic recording according to the present invention, the second layer may lie between the second part and each of the first and second wall faces, but the third layer need not lie between them.

In the magnetic head for perpendicular magnetic recording according to the present invention, the second layer and the third layer may lie between the second part and each of the first and second wall faces. A portion of the third layer lying between the second part and each of the first and second wall faces may have a thickness smaller than that of a portion of the third layer lying between the first part and each of the first and second wall faces.

In the magnetic head for perpendicular magnetic recording according to the present invention, the second layer may be composed of a first film and a second film, the first film being in contact with the first layer, the second film being interposed between the first film and the main magnetic pole and in contact with the first film. The first film may be formed of one of Ti, Cr, and Ta. The second film may be formed of one of Ru, Ni, Mo, W, Hf, and Zr.

In the magnetic head for perpendicular magnetic recording according to the present invention, a portion of the second layer lying between the main magnetic pole and each of the first and second wall faces may decrease in thickness with decreasing distance to the bottom surface.

A head assembly according to the present invention includes a slider that is disposed to face a recording medium, and a supporter that flexibly supports the slider. The slider includes the magnetic head for perpendicular magnetic recording according to the present invention.

A magnetic recording device according to the present invention includes a recording medium, a slider that is disposed to face the recording medium, and a positioning device that supports the slider and positions the slider with respect to the recording medium. The slider includes the magnetic head for perpendicular magnetic recording according to the present invention.

A manufacturing method for the magnetic head for perpendicular magnetic recording according to the present invention includes the steps of: forming the accommodation part; forming the main magnetic pole; and forming the coil. The step of forming the accommodation part includes the steps of: forming the first layer; forming the second layer; forming an initial third layer to cover the second layer, the initial third layer being intended to be made into the third layer later; and etching the initial third layer in part so as to make the initial third layer into the third layer. In the step of etching the initial third layer in part, the second layer functions as an etching stopper for stopping the progress of etching.

In the manufacturing method for the magnetic head according to the present invention, the inorganic insulating material used to form the third layer may be alumina.

In the manufacturing method for the magnetic head according to the present invention, the second layer may have an etching rate lower than or equal to ⅕ that of the initial third layer in the step of etching the initial third layer in part.

In the manufacturing method for the magnetic head according to the present invention, reactive ion etching may be employed in the step of etching the initial third layer in part. In such a case, the inorganic insulating material used to form the third layer may be alumina. The reactive ion etching may use Cl ion as its reactive gas ion. The second layer may have an etching resistance higher than that of the third layer against the Cl ion.

In the manufacturing method for the magnetic head according to the present invention, wet etching may be employed in the step of etching the initial third layer in part. In such a case, the inorganic insulating material used to form the third layer may be alumina. The wet etching may use an alkaline etchant. The second layer may have an etching resistance higher than that of the third layer against the etchant.

In the manufacturing method for the magnetic head according to the present invention, the main magnetic pole may be formed by electroplating in the step of forming the main magnetic pole.

In the manufacturing method for the magnetic head according to the present invention, the distance from the medium facing surface to the boundary between the first part and the second part may fall within a range of 2 to 50 nm.

In the manufacturing method for the magnetic head according to the present invention, the second layer may lie between the second part and each of the first and second wall faces, but the third layer need not lie between them.

In the manufacturing method for the magnetic head according to the present invention, the second layer and the third layer may lie between the second part and each of the first and second wall faces. A portion of the third layer lying between the second part and each of the first and second wall faces may have a thickness smaller than that of a portion of the third layer lying between the first part and each of the first and second wall faces.

In the manufacturing method for the magnetic head according to the present invention, the second layer may be composed of a first film and a second film, the first film being in contact with the first layer, the second film being interposed between the first film and the main magnetic pole and in contact with the first film. The first film may be formed of one of Ti, Cr, and Ta. The second film may be formed of one of Ru, Ni, Mo, W, Hf, and Zr.

In the manufacturing method for the magnetic head according to the present invention, a portion of the second layer lying between the main magnetic pole and each of the first and second wall faces may decrease in thickness with decreasing distance to the bottom surface.

In the manufacturing method for the magnetic head according to the present invention, the first layer may have a bottom-forming part that forms the bottom surface of the groove of the first layer, and a first wall-face-forming part and a second wall-face-forming part that respectively form the first wall face and the second wall face of the groove of the first layer. The step of forming the first layer may include the steps of forming the bottom-forming part; and forming a preliminary wall-face-forming part on the bottom-forming part, the preliminary wall-face-forming part having a first preliminary wall face and a second preliminary wall face whose shapes are the same as those of the first wall face and the second wall face. In this case, after the formation of the preliminary wall-face-forming part, the second and third layers are formed in a space formed by the first and second preliminary wall faces and the bottom surface that is formed by the bottom-forming part. In this case, the step of forming the first layer further includes the steps of: removing the preliminary wall-face-forming part after the formation of the second and third layers; and forming the first and second wall-face-forming parts after the removal of the preliminary wall-face-forming part.

In the manufacturing method for the magnetic head according to the present invention, the first layer may have a bottom-forming part that forms the bottom surface of the groove of the first layer, and a first wall-face-forming part and a second wall-face-forming part that respectively form the first wall face and the second wall face of the groove of the first layer. The step of forming the first layer may include the step of forming a preliminary first layer that includes a portion to become the bottom-forming part later and that has a preliminary groove having a shape the same as that of the groove of the first layer. In this case, the second and third layers are formed in the preliminary groove after the formation of the preliminary first layer. In this case, the step of forming the first layer further includes the steps of: forming the bottom-forming part after the formation of the second and third layers, by removing the preliminary first layer except the portion to become the bottom-forming part; and forming the first and second wall-face-forming parts after the formation of the bottom-forming part.

According to the magnetic head for perpendicular magnetic recording, the manufacturing method for the same, the head assembly, and the magnetic recording device of the present invention, the cross section of the second part of the main magnetic pole perpendicular to the direction of flow of the magnetic flux is larger in area compared with that of the first part at the boundary between the first part and the second part. According to the present invention, it is thus possible to introduce a large amount of magnetic flux to the medium facing surface through the main magnetic pole by virtue of the increased area of the cross section of the second part perpendicular to the direction of flow of the magnetic flux, without increasing the area of the end face of the main magnetic pole located in the medium facing surface. The present invention thus allows improvements in recording density and overwrite property. Moreover, according to the present invention, it is possible by virtue of the accommodation part to precisely control the shape of the main magnetic pole that allows improvements in recording density and overwrite property as described above.

Other objects, features and advantages of the present invention will become fully apparent from the following description.

BRIEF DESCRIPTION OF THE DRAWINGS

FIG. 18A to FIG. 18C are explanatory diagrams showing a step that follows the step shown in FIG. 17A to FIG. 17C.

FIG. 20 is a cross-sectional view showing a step that follows the step shown in FIG. 19A to FIG. 19C.

FIG. 21 is a cross-sectional view showing a step that follows the step shown in FIG. 20.

FIG. 22 is a cross-sectional view showing a step that follows the step shown in FIG. 21.

DETAILED DESCRIPTION OF THE PREFERRED EMBODIMENTS

First Embodiment

Figure 9:
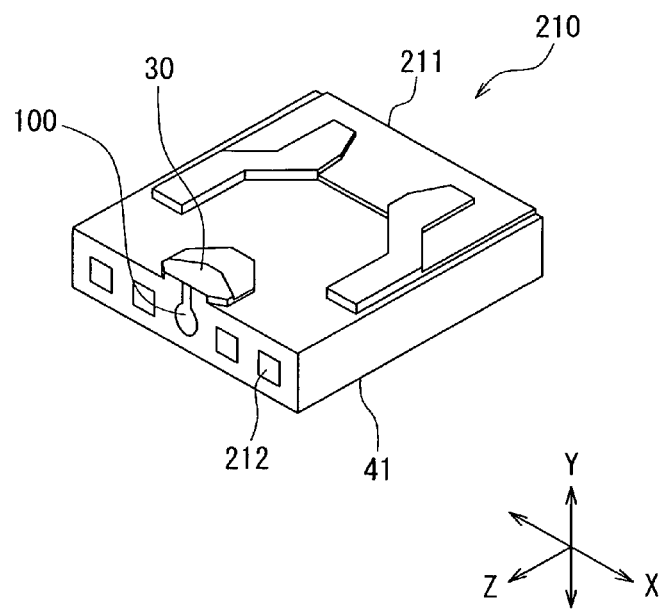
FIG. 9 is a perspective view showing a slider including the magnetic head according to the first embodiment of the invention.

Preferred embodiments of the present invention will now be described in detail with reference to the drawings. Reference is first made to FIG. 9 to describe a slider 210 including a magnetic head according to the first embodiment of the invention. In a magnetic recording device, the slider 210 is disposed to face a circular-plate-shaped recording medium (a magnetic disk) that is driven to rotate. In FIG. 9, the X direction is a direction across the tracks of the recording medium, the Y direction is a direction perpendicular to the surface of the recording medium, and the Z direction is the direction of travel of the recording medium as seen from the slider 210. The X, Y and Z directions are orthogonal to one another. The slider 210 has a base body 211. The base body 211 is nearly hexahedron-shaped. One of the six surfaces of the base body 211 is designed to face the surface of the recording medium. At this one of the six surfaces, there is formed a medium facing surface 30 to face the recording medium. When the recording medium rotates and travels in the Z direction, an airflow passing between the recording medium and the slider 210 causes a lift below the slider 210 in the Y direction of FIG. 9. This lift causes the slider 210 to fly over the surface of the recording medium. The magnetic head 100 according to the present embodiment is formed near the air-outflow-side end (the end in the Z direction) of the slider 210. A plurality of terminals 212 are also provided at the air-outflow-side end of the slider 210.

A head assembly according to the present embodiment will now be described with reference to FIG. 10. The head assembly according to the present embodiment includes the slider 210 shown in FIG. 9 and a supporter that flexibly supports the slider 210. Forms of the head assembly include a head gimbal assembly and a head arm assembly described below.

The head gimbal assembly 220 will be first described. The head gimbal assembly 220 includes the slider 210, and a suspension 221 serving as the supporter that flexibly supports the slider 210. The suspension 221 includes: a plate-spring-shaped load beam 222 formed of, e.g., stainless steel; a flexure 223 to which the slider 210 is joined, the flexure 223 being provided at an end of the load beam 222 and giving an appropriate degree of freedom to the slider 210; and a base plate 224 provided at the other end of the load beam 222. The base plate 224 is configured to be attached to an arm 230 of an actuator for moving the slider 210 along the X direction across the tracks of the recording medium 262. The actuator has the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly including the arm 230 and the head gimbal assembly 220 attached to the arm 230 is called a head arm assembly. An assembly including a carriage having a plurality of arms with a plurality of head gimbal assemblies 220 respectively attached to the arms is called a head stack assembly.

Figure 10:
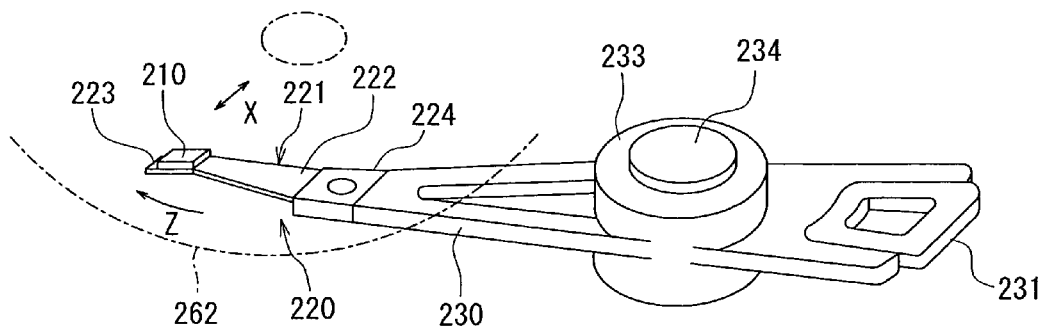
FIG. 10 is a perspective view showing a head arm assembly according to the first embodiment of the invention.

FIG. 10 shows the head arm assembly according to the present embodiment. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to a shaft 234 for rotatably supporting the arm 230.

Figure 11:
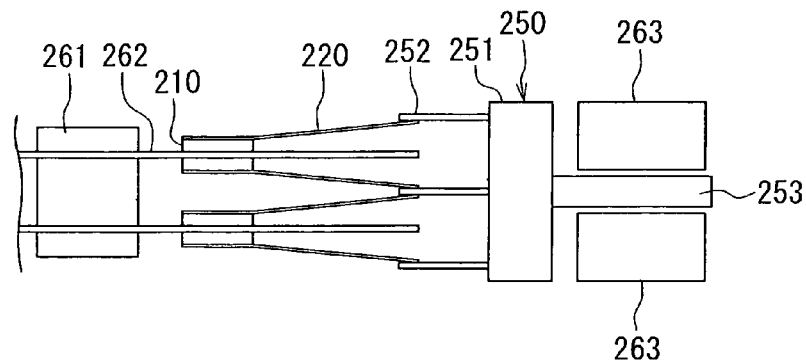
FIG. 11 is an explanatory diagram for explaining the main part of a magnetic recording device according to the first embodiment of the invention.
Figure 12:
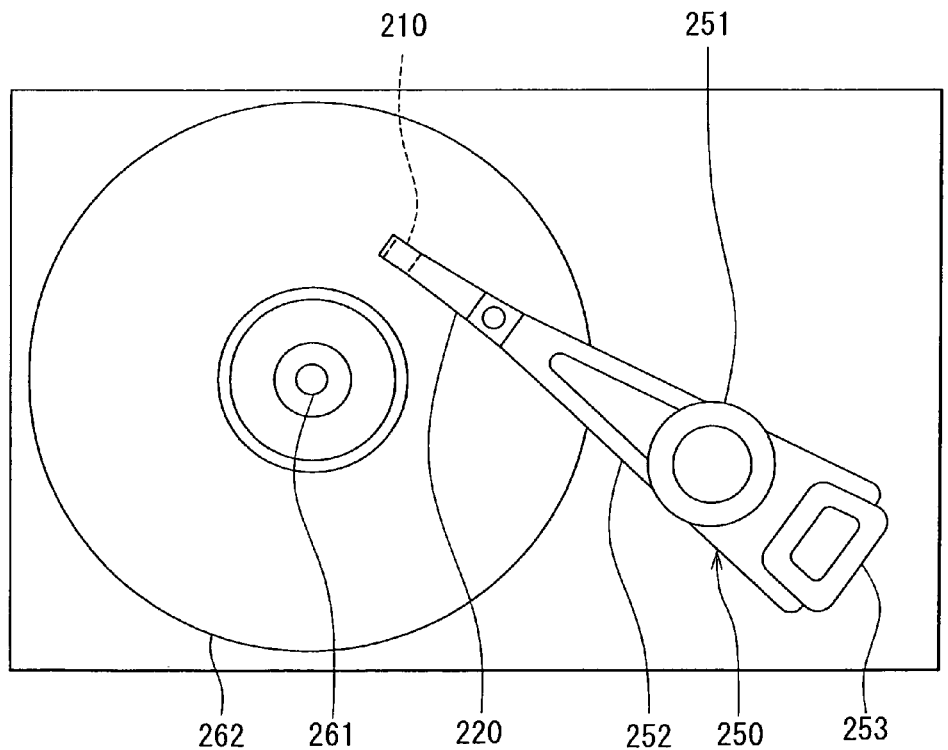
FIG. 12 is a plan view of the magnetic recording device according to the first embodiment of the invention.

Reference is now made to FIG. 11 and FIG. 12 to describe an example of the head stack assembly and the magnetic recording device according to the present embodiment. FIG. 11 is an explanatory diagram showing the main part of the magnetic recording device. FIG. 12 is a plan view of the magnetic recording device. The head stack assembly 250 includes a carriage 251 having a plurality of arms 252. A plurality of head gimbal assemblies 220 are attached to the arms 252 such that the assemblies 220 are aligned in the vertical direction with spacing between every adjacent ones. A coil 253 that is part of the voice coil motor is mounted on a side of the carriage 251 opposite to the arms 252. The head stack assembly 250 is installed in the magnetic recording device. The magnetic recording device includes a plurality of recording media 262 mounted on a spindle motor 261. Two sliders 210 are allocated to each recording medium 262 such that the two sliders 210 are opposed to each other with the recording medium 262 located therebetween. The voice coil motor includes permanent magnets 263 arranged to be opposed to each other with the coil 253 of the head stack assembly 250 located therebetween. The actuator and the head stack assembly 250 except the sliders 210 support the sliders 210 and position them with respect to the recording media 262.

In the magnetic recording device according to the present embodiment, the actuator moves the slider 210 across the tracks of the recording medium 262 and positions the slider 210 with respect to the recording medium 262. The magnetic head included in the slider 210 records data on the recording medium 262 by using the recording head, and reproduces data stored on the recording medium 262 by using the reproducing head.

Figure 7:
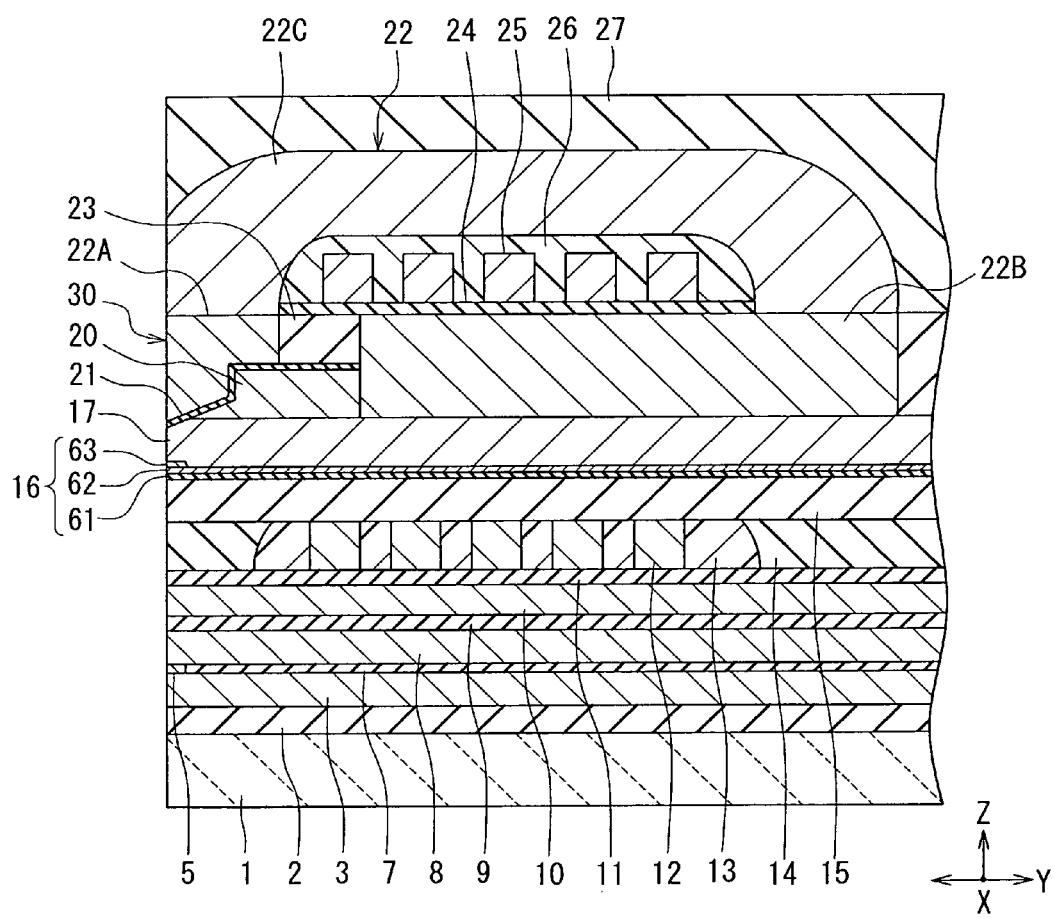
FIG. 7 is a cross-sectional view showing the configuration of the magnetic head according to the first embodiment of the invention.
Figure 8:
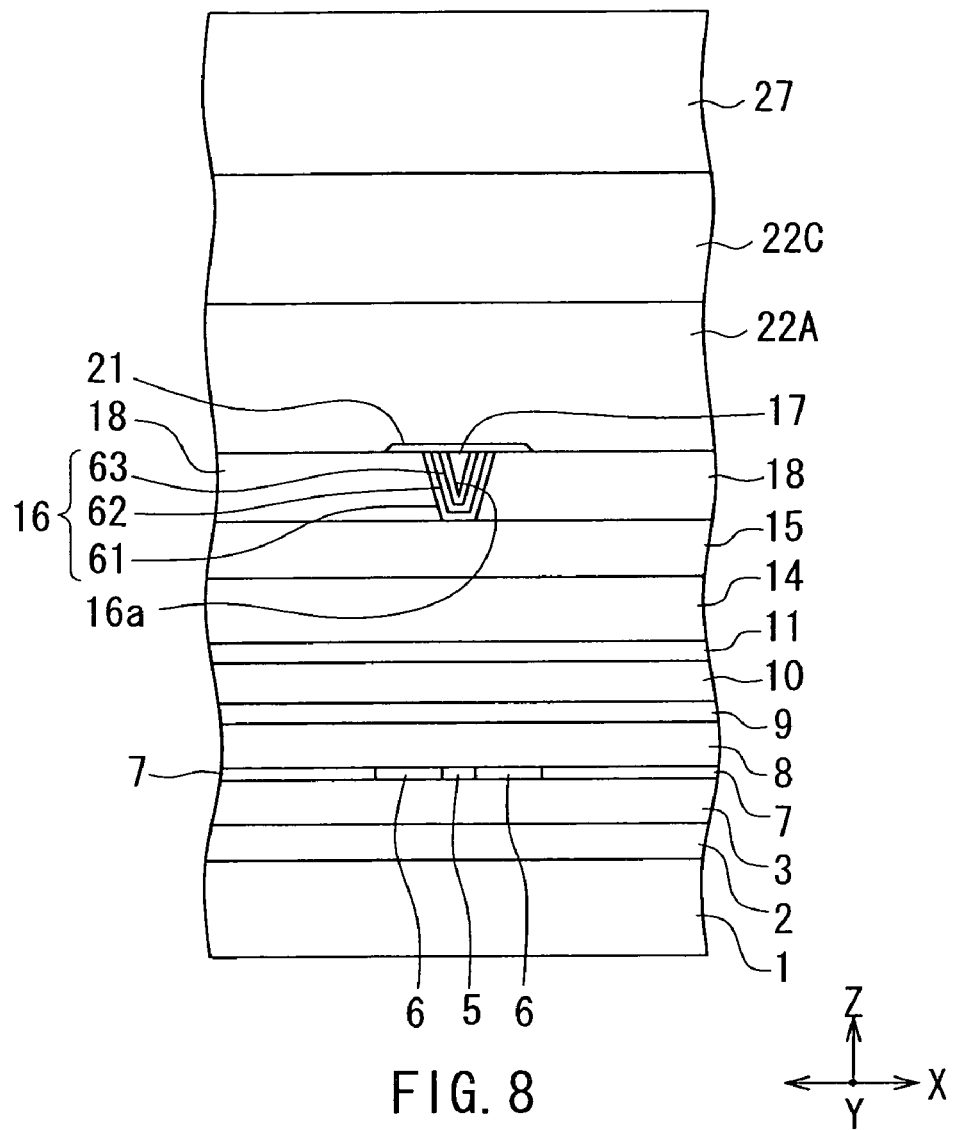
FIG. 8 is a front view showing the medium facing surface of the magnetic head according to the first embodiment of the invention.

Reference is now made to FIG. 7 and FIG. 8 to describe the configuration of the magnetic head according to the present embodiment. FIG. 7 is a cross-sectional view showing the configuration of the magnetic head. FIG. 8 is a front view showing the medium facing surface of the magnetic head. Note that FIG. 7 shows a cross section perpendicular to the medium facing surface and the top surface of the substrate. The X, Y and Z directions shown in FIG. 9 are also shown in FIG. 7 and FIG. 8. In FIG. 7 the X direction is orthogonal to the Y and Z directions. In FIG. 8 the Y direction is orthogonal to the X and Z directions. The track width direction in the magnetic head is the same as the X direction.

As shown in FIG. 7, the magnetic head according to the present embodiment has the medium facing surface 30 that faces the recording medium. As shown in FIG. 7 and FIG. 8, the magnetic head includes a substrate 1 made of a ceramic material such as aluminum oxide-titanium carbide ($Al_2O_3$—TiC), an insulating layer 2 disposed on the substrate 1, and a bottom shield layer 3 made of a magnetic material and disposed on the insulating layer 2.

The magnetic head further includes a magnetoresistive (MR) element 5 as a reproducing element disposed on the bottom shield layer 3, and two bias magnetic field applying layers 6 that are located on both sides of the MR element 5 opposite to each other in the track width direction and apply a bias magnetic field to the MR element 5. Note that not-shown insulating films are respectively provided between each bias magnetic field applying layer 6 and the bottom shield layer 3, and between each bias magnetic field applying layer 6 and the MR element 5. The magnetic head further includes an insulating layer 7 disposed around the MR element 5 and the bias magnetic field applying layers 6 on the bottom shield layer 3, and a first top shield layer 8 made of a magnetic material and disposed over the MR element 5, the bias magnetic field applying layers 6 and the insulating layer 7.

An end of the MR element 5 is located in the medium facing surface 30. The MR element 5 may be a giant magnetoresistive (GMR) element or a tunneling magnetoresistive (TMR) element, for example. The GMR element may be of either the current-in-plane (CIP) type in which a sense current for detecting magnetic signals is fed in a direction nearly parallel to the plane of layers constituting the GMR element or the current-perpendicular-to-plane (CPP) type in which the sense current is fed in a direction nearly perpendicular to the plane of layers constituting the GMR element.

When the MR element 5 is a TMR element or a CPP-type GMR element, the bottom shield layer 3 and the first top shield layer 8 may also function as electrodes for feeding the sense current to the MR element 5. FIG. 7 shows the case where the MR element 5 is a TMR element or a CPP-type GMR element. When the MR element 5 is a CIP-type GMR element, insulating films are respectively provided between the MR element 5 and the bottom shield layer 3 and between the MR element 5 and the first top shield layer 8, and two wiring layers for feeding the sense current to the MR element 5 are provided between these insulating films.

The magnetic head further includes a nonmagnetic layer 9 and a second top shield layer 10 that are arranged in this order on the first top shield layer 8. The nonmagnetic layer 9 is made of a nonmagnetic material such as alumina. The second top shield layer 10 is made of a magnetic material. The parts from the bottom shield layer 3 to the second top shield layer 10 constitute the reproducing head.

The magnetic head further includes: an insulating layer 11 made of an insulating material and disposed on the second top shield layer 10; a coil 12 disposed on the insulating layer 11; an insulating layer 13 made of an insulating material and disposed around the coil 12 and in the space between every adjacent turns of the coil 12; and an insulating layer 14 made of an insulating material and disposed around the insulating layer 13. The coil 12 is planar spiral-shaped. The coil 12 and the insulating layers 13 and 14 are flattened at the top. The insulating layers 11 and 14 are made of alumina, for example. The insulating layer 13 is made of photoresist, for example. The coil 12 is made of a conductive material such as copper. The magnetic head further includes an insulating layer 15 made of an insulating material and disposed over the top surfaces of the coil 12 and the insulating layers 13 and 14. The insulating layer 15 is made of alumina, for example.

Figure 4:
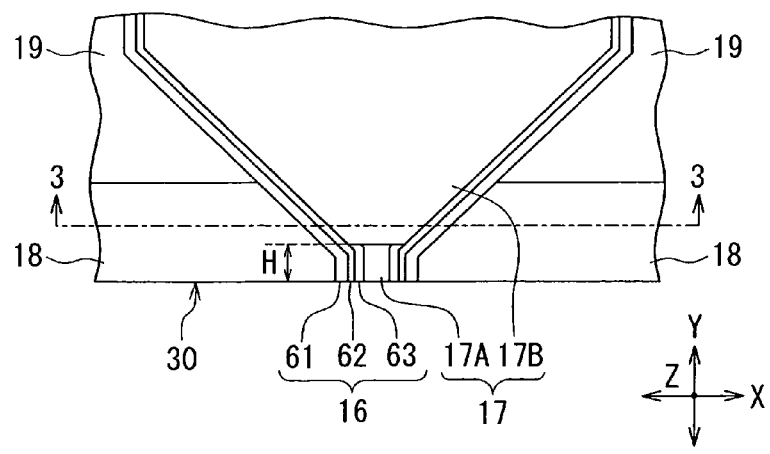
FIG. 4 is a plan view showing a part of the main magnetic pole of the magnetic head according to the first embodiment of the invention.

The magnetic head further includes an accommodation part 16 disposed on the insulating layer 15, and a main magnetic pole 17 made of a magnetic material. FIG. 4 is a plan view showing a part of the main magnetic pole 17. The accommodation part 16 has an accommodating groove 16a that accommodates the main magnetic pole 17. The magnetic head further includes: two side shield layers 18 disposed on the insulating layer 15 at positions on both sides of the accommodation part 16 opposite to each other in the track width direction in the area near the medium facing surface 30; and an insulating layer 19 (see FIG. 4) disposed around the accommodating part 16 and the side shield layers 18 on the insulating layer 15. The main magnetic pole 17 and the side shield layers 18 are each made of a magnetic material. The main magnetic pole 17 and the side shield layers 18 may each be made of NiFe, CoFe, CoNiFe, or CoNi. The accommodation part 16 includes a first layer 61, a second layer 62, and a third layer 63. The accommodation part 16 and the main magnetic pole 17 will be described in more detail later.

The magnetic head further includes a nonmagnetic layer 20 made of a nonmagnetic material and disposed on a part of the top surface of the main magnetic pole 17. The nonmagnetic layer 20 may be composed of a single layer or a plurality of layers. The nonmagnetic material used to form the nonmagnetic layer 20 may be an insulating material or a nonmagnetic metal material. The nonmagnetic layer 20 may be composed of a Ru layer or a stack of Ti, Ru and Ti layers. The shape of the nonmagnetic layer 20 will be described in detail later.

The magnetic head further includes a gap layer 21 made of a nonmagnetic material and disposed on the accommodation part 16, the main magnetic pole 17 and the nonmagnetic layer 20. As shown in FIG. 7, neither the nonmagnetic layer 20 nor the gap layer 21 covers a part of the top surface of the main magnetic pole 17 away from the medium facing surface 30. The nonmagnetic material used to form the gap layer 21 may be an insulating material or a nonmagnetic metal material.

The magnetic head further includes a main shield 22. The main shield 22 includes a first layer 22A, a yoke layer 22B, and a second layer 22C. The first layer 22A is located on the gap layer 21 and the two side shield layers 18. The yoke layer 22B is located on the part of the top surface of the main magnetic pole 17 away from the medium facing surface 30.

The second layer 22C connects the first layer 22A and the yoke layer 22B to each other. Each of the first layer 22A and the second layer 22C has an end face located in the medium facing surface 30. Each of the first layer 22A, the yoke layer 22B and the second layer 22C is made of a magnetic material. The layers 22A to 22C may each be made of NiFe, CoFe, CoNiFe, or CoNi.

The magnetic head further includes a nonmagnetic layer 23 made of a nonmagnetic material and disposed around the first layer 22A and the yoke layer 22B. The nonmagnetic material used to form the nonmagnetic layer 23 may be an insulating material or a nonmagnetic metal material.

The magnetic head further includes: an insulating layer 24 disposed over areas of the top surfaces of the yoke layer 22B and the nonmagnetic layer 23 above which a coil 25 mentioned below is to be disposed; the coil 25 disposed on the insulating layer 24; and an insulating layer 26 covering the coil 25. The insulating layer 24 is made of alumina, for example. The coil 25 is planar spiral-shaped. A part of the coil 25 passes between the second layer 22C and the yoke layer 22B. The coil 25 is made of a conductive material such as copper. The insulating layer 26 is made of photoresist, for example. The magnetic head further includes a protection layer 27 made of an insulating material such as alumina and disposed to cover the second layer 22C. The parts from the coil 12 to the second layer 22C of the main shield 22 constitute the recording head.

As has been described, the magnetic head according to the present embodiment includes the medium facing surface 30 that faces the recording medium, the reproducing head, and the recording head. The reproducing head and the recording head are stacked on the substrate 1. The reproducing head is disposed backward along the direction of travel of the recording medium (the Z direction) (in other words, disposed closer to the air inflow end of the slider), while the recording head is disposed forward along the direction of travel of the recording medium (in other words, disposed closer to the air outflow end of the slider).

The reproducing head includes: the MR element 5 as the reproducing element; the bottom shield layer 3 and the first top shield layer 8 for shielding the MR element 5, the shield layers 3 and 8 having respective portions that are located near the medium facing surface 30 and are opposed to each other with the MR element 5 therebetween; and the two bias magnetic field applying layers 6 disposed on both sides of the MR element 5 that are opposite to each other in the track width direction.

The recording head includes the coil 12, the accommodation part 16, the main magnetic pole 17, the side shield layers 18, the nonmagnetic layer 20, the gap layer 21, the main shield 22, and the coil 25. When a recording electric current is supplied to the coils 12 and 25, the coils 12 and 25 produce magnetic fields in opposite directions at their respective centers. The coil 25 produces a magnetic field corresponding to data to be recorded on the recording medium. The coil 12 produces a magnetic field that prevents the magnetic field produced by the coil 25 from affecting the reproducing head. Note that the coil 12 is not an essential component of the recording head and can be dispensed with.

The main magnetic pole 17 has an end face located in the medium facing surface 30, allows a magnetic flux corresponding to the magnetic field produced by the coil 25 to pass, and produces a recording magnetic field for recording data on the recording medium by means of the perpendicular magnetic recording system.

The main shield 22 has an end face located in the medium facing surface 30, and is coupled to a part of the main magnetic pole 17 away from the medium facing surface 30. The gap layer 21 is provided between the main magnetic pole 17 and the first layer 22A of the main shield 22. The two side shield layers 18 are disposed on both sides of the main magnetic pole 17 opposite to each other in the track width direction, so that they are adjacent to the main magnetic pole 17 with the accommodation part 16 in between. The two side shield layers 18 are coupled to the first layer 22A. The main shield 22 and the side shield layers 18 function as shields for the main magnetic pole 17.

In the medium facing surface 30, the end face of the main shield 22 is located forward of the end face of the main magnetic pole 17 along the direction of travel of the recording medium (the Z direction) with a predetermined distance provided therebetween by the thickness of the gap layer 21. The thickness of the gap layer 21 is preferably equal to or smaller than 200 nm, or more preferably within the range of 25 to 50 nm, so that the main shield 22 can fully exhibit its function as a shield.

The position of the end of a bit pattern to be recorded on the recording medium depends on the position of an edge of the end face of the main magnetic pole 17 located in the medium facing surface 30, the edge being closer to the gap layer 21. The main shield 22 and the side shield layers 18 take in a magnetic flux that is generated from the end face of the main magnetic pole 17 located in the medium facing surface 30 and that expands in directions except the direction perpendicular to the plane of the recording medium, so that the magnetic flux is prevented from reaching the recording medium. It is thereby possible to improve the recording density. The main shield 22 and the side shield layers 18 also take in a disturbance magnetic field that is applied to the magnetic head from the outside thereof. Consequently, it is possible to prevent erroneous recording on the recording medium caused by the disturbance magnetic field intensively taken into the main magnetic pole 17. The main shield 22 also has the function of returning a magnetic flux that has been generated from the end face of the main magnetic pole 17 and has magnetized the recording medium.

Figure 1:
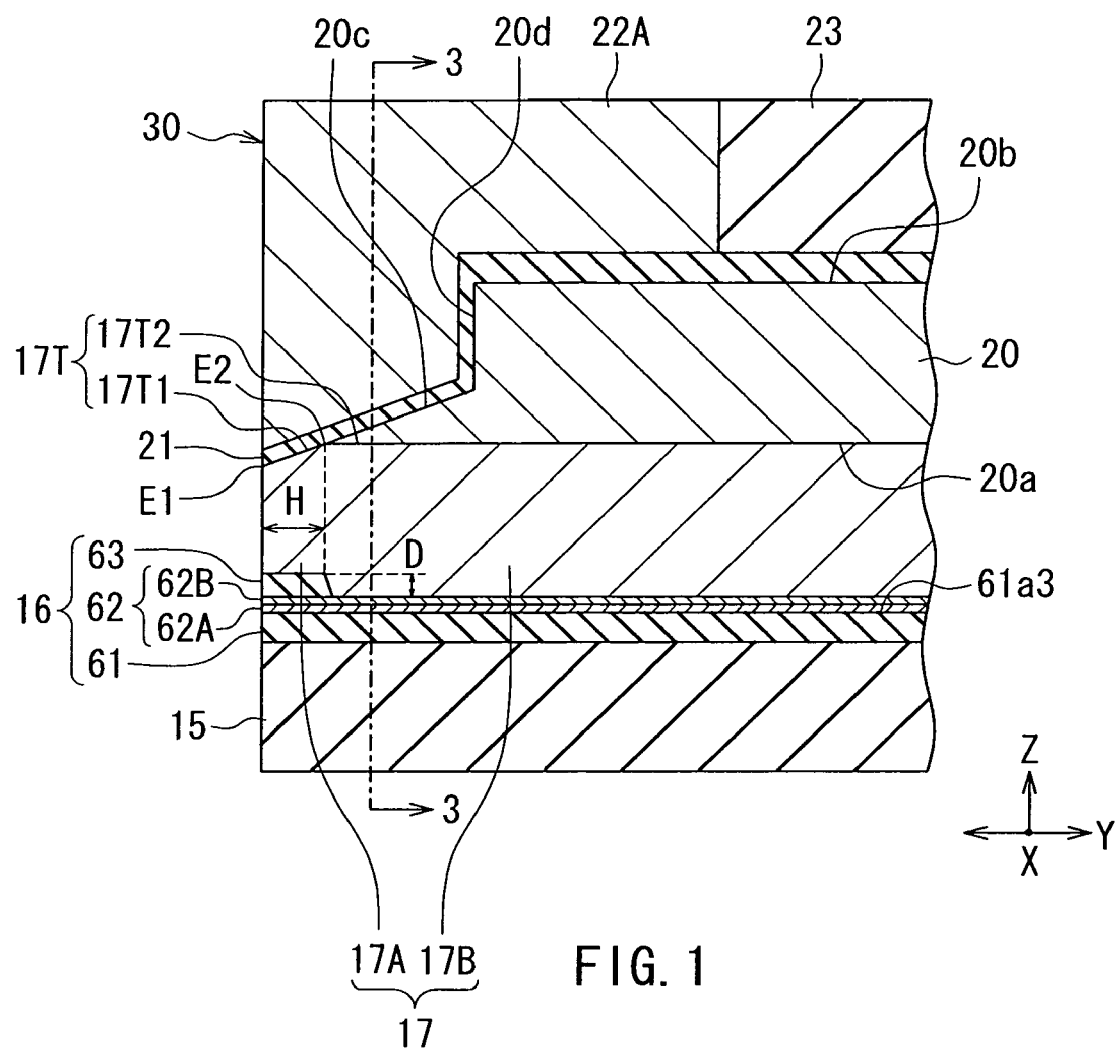
FIG. 1 is a cross-sectional view showing the main part of a magnetic head according to a first embodiment of the invention.
Figure 2:
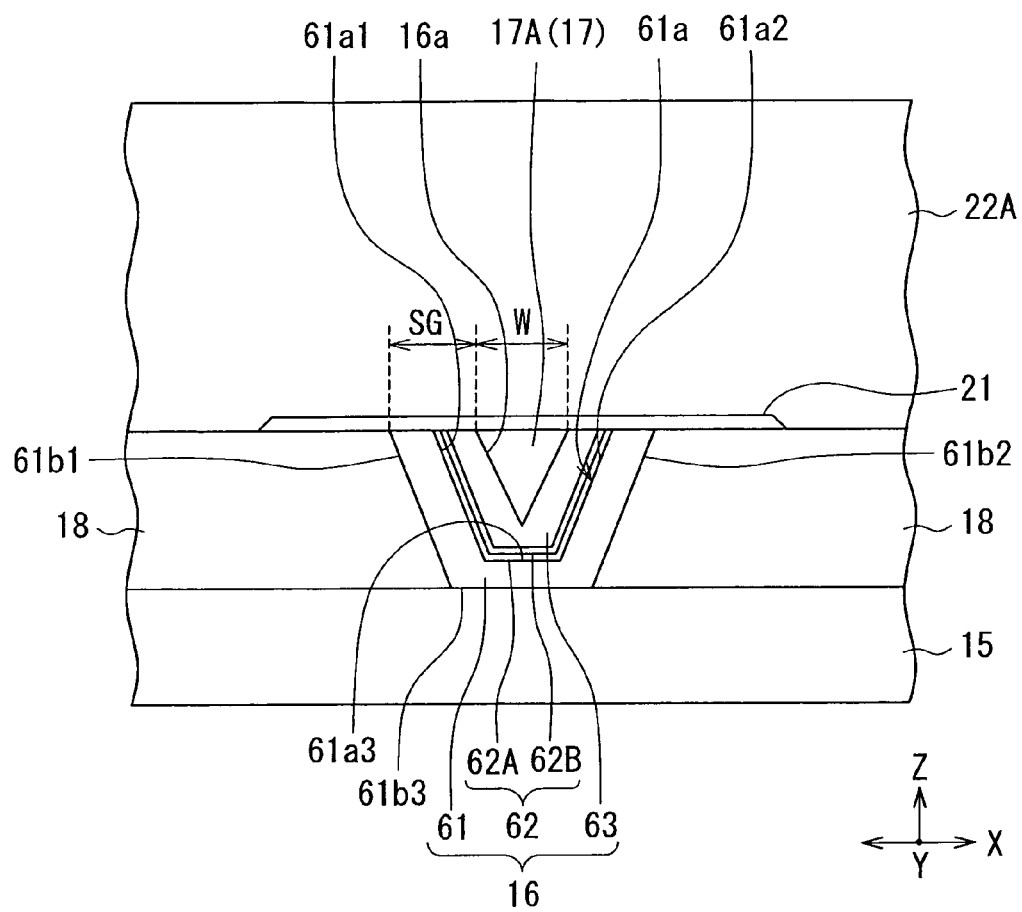
FIG. 2 is a front view showing a part of the medium facing surface of the magnetic head according to the first embodiment of the invention.
Figure 3:
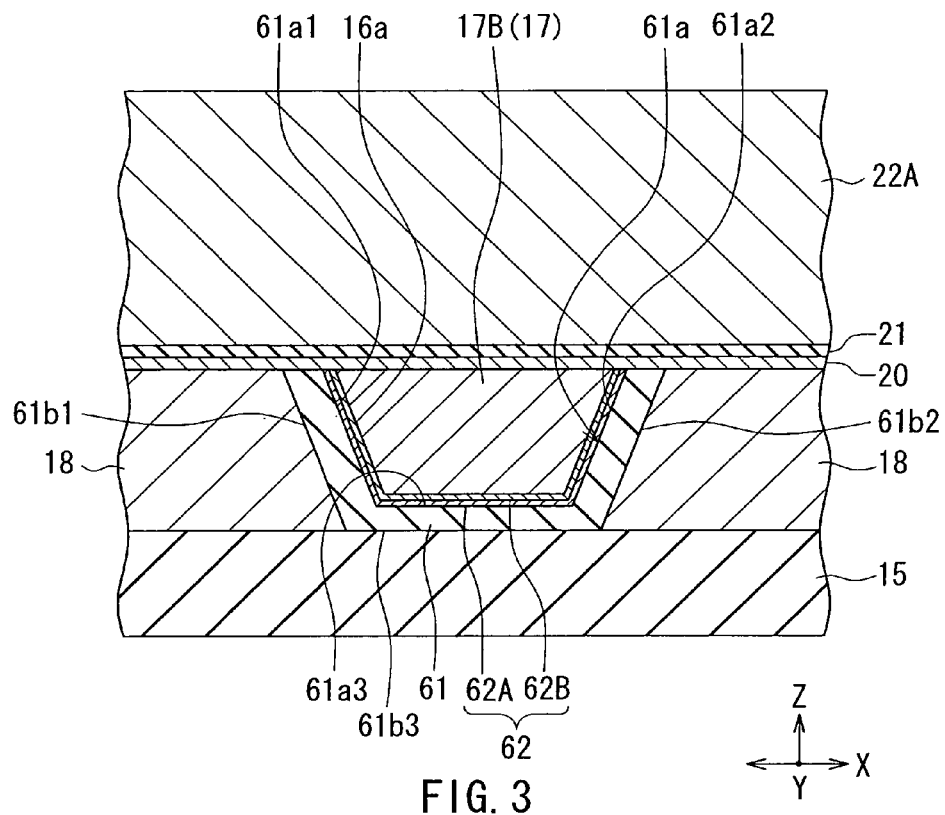
FIG. 3 shows a cross section taken along line 3-3 of FIG. 1.
Figure 5:
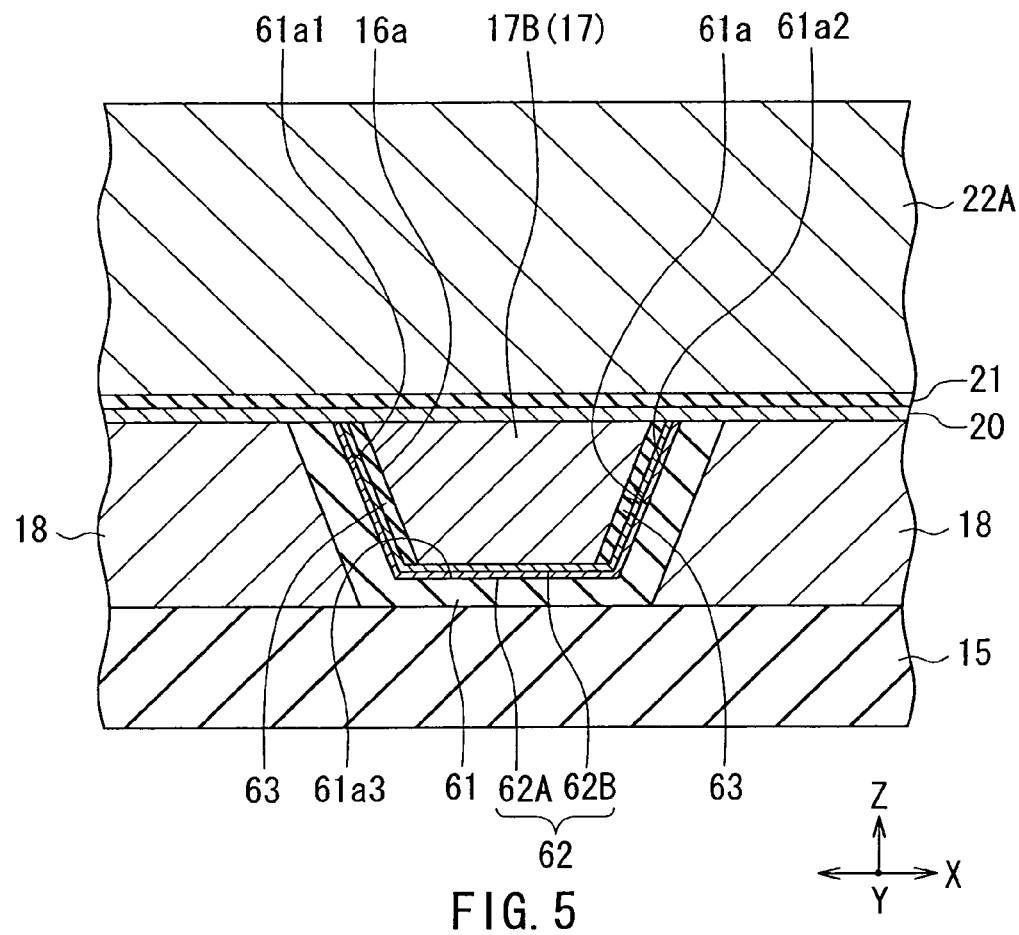
FIG. 5 is a cross-sectional view showing the accommodation part and the main magnetic pole of a modification example of the first embodiment of the invention.
Figure 6:
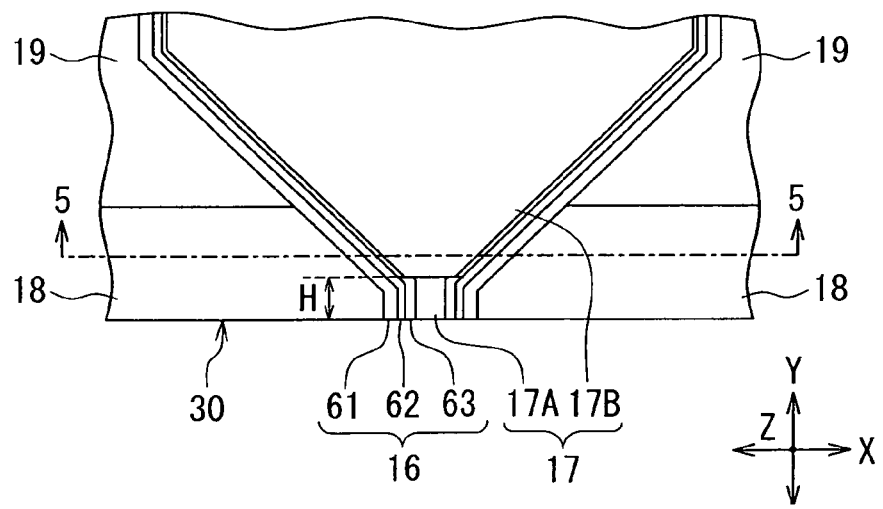
FIG. 6 is a plan view showing a part of the main magnetic pole of the modification example of the first embodiment of the invention.

A detailed description will now be given of the accommodation part 16 and the main magnetic pole 17 with reference to FIG. 1 to FIG. 6. FIG. 1 is a cross-sectional view showing the main part of the magnetic head according to the present embodiment. FIG. 2 is a front view showing a part of the medium facing surface 30 of the magnetic head according to the present embodiment. FIG. 3 shows a cross section taken along line 3-3 of FIG. 1. The line 3-3 in FIG. 4 indicates the position of the cross section of FIG. 3. FIG. 5 is a cross-sectional view showing the accommodation part 16 and the main magnetic pole 17 of a modification example of the present embodiment. FIG. 6 is a plan view showing a part of the main magnetic pole 17 of the modification example of the present embodiment. The line 5-5 in FIG. 6 indicates the position of the cross section of FIG. 5.

As shown in FIG. 4, the main magnetic pole 17 includes a first part 17A that extends from the medium facing surface 30 to a point at a predetermined distance H from the medium facing surface 30, and a second part 17B other than the first part 17A. The first part 17A has the end face located in the medium facing surface 30. The end face of the main magnetic pole 17 located in the medium facing surface 30 decreases in width (dimension in the X direction) with decreasing distance to the top surface of the substrate 1. The width of this end face taken at its edge closer to the gap layer 21 defines the track width W. The track width W is within the range of 0.03 to 0.20 µm, for example. The distance H is within the range of 2 to 50 nm, for example.

In the example shown in FIG. 1, the first part 17A has a top surface, a bottom end, and two side surfaces that connect the top surface to the bottom end and decrease in distance from each other with decreasing distance to the top surface of the substrate 1. In this example, the bottom end of the first part 17A is shaped like an edge formed by contact of the two side surfaces with each other. However, the bottom end may be a flat surface connecting the respective bottom ends of the two side surfaces to each other.

As shown in FIG. 4, the top surface of the first part 17A is almost uniform in width (dimension in the X direction) irrespective of the distance from the medium facing surface 30. At the boundary between the first part 17A and the second part 17B, the top surface of the second part 17B shows a sudden increase in width relative to the width of the top surface of the first part 17A. The width of the top surface of the second part 17B gradually increases with increasing distance from the medium facing surface 30, and then becomes uniform.

As shown in FIG. 3, the second part 17B has the top surface, a bottom surface, and two side surfaces that connect the top surface to the bottom surface and decrease in distance from each other with decreasing distance to the top surface of the substrate 1.

As shown in FIG. 2 and FIG. 3, the accommodation part 16 has the accommodating groove 16a that accommodates the main magnetic pole 17. The accommodation part 16 includes the first layer 61, the second layer 62, and the third layer 63. The first layer 61 has a groove 61a greater than the accommodating groove 16a. The groove 61a has a first wall face 61a1 and a second wall face 61a2 that are located on both sides of the main magnetic pole 17 opposite to each other in the track width direction (the X direction), and a bottom surface 61a3 that connects the wall faces 61a1 and 61a2 to each other. The distance between the wall faces 61a1 and 61a2 in the track width direction decreases with decreasing distance to the top surface of the substrate 1. The first layer 61 further has two outer wall faces 61b1 and 61b2, and a bottom surface 61b3 that connects the outer wall faces 61b1 and 61b2 to each other. The distance between the surfaces 61a1 and 61b1, the distance between the surfaces 61a2 and 61b2, and the distance between the surfaces 61a3 and 61b3 are substantially equal. The foregoing distance is defined as the thickness of the first layer 61. The thickness of the first layer 61 is greater than zero and smaller than or equal to 120 nm, for example. The first layer 61 is formed of, for example, an inorganic insulating material such as alumina. Forming the first layer 61 of a hard inorganic insulating material allows precisely controlling the shape of the accommodating groove 16a of the accommodation part 16.

The second layer 62 is located in the groove 61a of the first layer 61 so as to lie between the first layer 61 and the main magnetic pole 17. The second layer 62 is formed of a metal material different from the material used to form the first layer 61. The dimension of the second layer 62 in directions perpendicular to the surfaces 61a1, 61a2 and 61a3 of the groove 61a of the first layer 61 will be defined as the thickness of the second layer 62. The thickness of the second layer 62 is within the range of 1 to 20 nm, for example. The amount of deposition of the second layer 62 may vary according to the position along the direction of depth of the groove 61a. Due to such variations in deposition amount, the portions of the second layer 62 lying between the main magnetic pole 18 and the first and second wall faces 61a1 and 61a2 may decrease in thickness with decreasing distance to the bottom surface 61a3.

The second layer 62 may be composed of a single film or a plurality of films. In the example shown in FIG. 2 and FIG. 3, the second layer 62 is composed of a first film 62A that is in contact with the first layer 61, and a second film 62B that is interposed between the first film 62A and the main magnetic pole 17 and is in contact with the first film 62A. In this example, the first film 62A is formed of one of Ti, Cr, and Ta, while the second film 62B is formed of one of Ru, Ni, Mo, W, Hf, and Zr.

The third layer 63 is located in the groove 61a of the first layer 61 so as to be interposed in part between the second layer 62 and the main magnetic pole 17. The third layer 63 is formed of an inorganic insulating material such as alumina. The dimension of the third layer 63 in directions perpendicular to the surfaces 61a1, 61a2 and 61a3 of the groove 61a of the first layer 61 will be defined as the thickness of the third layer 63. The maximum thickness of the third layer 63 is within the range of 20 to 100 nm, for example. As shown in FIG. 3 and FIG. 5, the third layer 63 is not interposed at least between the second part 17B of the main magnetic pole 17 and the portion of the second layer 62 lying on the bottom surface 61a3 of the groove 61a of the first layer 61.

The third layer 63 may be either interposed or not interposed between the second part 17B of the main magnetic pole 17 and the portions of the second layer 62 that adjoin the wall faces 61a1 and 61a2 of the groove 61a of the first layer 61. In other words, the third layer 63 may be either interposed or not interposed between the second part 17B and the first and second wall faces 61a1 and 61a2. FIG. 3 and FIG. 4 show the case where the third layer 63 is not interposed between the second part 17B and the first and second wall faces 61a1 and 61a2.

FIG. 5 and FIG. 6 show the case where the third layer 63 is interposed between the second part 17B and the first and second wall faces 61a1 and 61a2. In such a case, the portions of the third layer 63 interposed between the second part 17B and the first and second wall faces 61a1 and 61a2 are smaller in thickness than the portions of the third layer 63 interposed between the first part 17A and the first and second wall faces 61a1 and 61a2.

As shown in FIG. 2, the second layer 62 and the third layer 63 lie between the first layer 61 of the accommodation part 16 and the first part 17A of the main magnetic pole 17. As shown in FIG. 3 and FIG. 5, the second layer 62 lies between the bottom surface 61a3 of the groove 61a of the first layer 61 and the second part 17B of the main magnetic pole 17, but the third layer 63 does not lie between them. As shown in FIG. 1, the distance between the bottom surface 61a3 and the second part 17B is thus smaller than that between the bottom surface 61a3 and the first part 17A. In other words, the bottom surface of the second part 17B is closer to the top surface of the substrate 1 than is the bottom end of the first part 17A. As shown in FIG. 1, the difference in level between the bottom surface of the second part 17B and the bottom end of the first part 17A will be designated by the reference symbol D. The difference in level D is equal to the thickness of the portion of the third layer 63 that lies between the bottom surface 61a3 of the groove 61a of the first layer 61 and the bottom end of the first part 17A of the main magnetic pole 17. The distance between the bottom surface 61a3 and the second part 17B is smaller than that between the bottom surface 61a3 and the first part 17A by the difference in level D.

The distance from the second part 17B to each of the first and second wall faces 61a1 and 61a2 is smaller than the distance from the first part 17A to each of the first and second wall faces 61a1 and 61a2.

In the medium facing surface 30, as shown in FIG. 2, the respective end faces of the two side shield layers 18 adjoin opposite sides of the end face of the main magnetic pole 17 in the track width direction, with the accommodation part 16 therebetween. The distance from each side shield layer 18 to the main magnetic pole 17, taken along the extension of the edge of the end face of the main magnetic pole 17 closer to the gap layer 21, will be referred to as a side gap length. The side gap length will be designated by the reference symbol SG. The side gap length SG preferably falls within the range of 0.8 to 2 times the track width W. If the side gap length SG exceeds twice the track width W, the side shield layers 18 cannot exert a sufficient shielding effect. This may cause adjacent track erase or wide-range adjacent track erase, or degrade the squeeze characteristic, which indicates the tolerance of adjacency of an adjacent track to the target track. If the side gap length SG falls below 0.8 times the track width W, the magnetic flux passing through the main magnetic pole 17 can leak to the side shield layers 18 before reaching the medium facing surface 30, thereby causing degradation of the overwrite property.

A detailed description will now be given of the shape of the top surface of the main magnetic pole 17 and the shape of the nonmagnetic layer 20 with reference to FIG. 1. As shown in FIG. 1, the top surface 17T of the main magnetic pole 17 includes a first part 17T1 and a second part 17T2. The first part 17T1 has a first edge E1 located in the medium facing surface 30, and a second edge E2 opposite thereto. The second part 17T2 is located farther from the medium facing surface 30 than is the first part 17T1 and connected to the first part 17T1 at the second edge E2.

The distance from the top surface of the substrate 1 to an arbitrary point on the first part 17T1 increases with increasing distance from the arbitrary point to the medium facing surface 30. The angle of inclination of the first part 17T1 with respect to the direction perpendicular to the medium facing surface 30 (the Y direction) is within the range of 15 to 35 degrees, for example.

The nonmagnetic layer 20 is disposed on the second part 17T2. The nonmagnetic layer 20 has a bottom surface 20a that is in contact with the second part 17T2, and a top surface 20b opposite to the bottom surface 20a. The position of the end of the bottom surface 20a closer to the medium facing surface 30 coincides with the position of the second edge E2. The nonmagnetic layer 20 further has an oblique surface 20c and a connecting surface 20d. The oblique surface 20c has an end that coincides with the end of the bottom surface 20a closer to the medium facing surface 30. The connecting surface 20d connects the end of the oblique surface 20c farther from the medium facing surface 30 and the end of the top surface 20b closer to the medium facing surface 30. The distance from the top surface of the substrate 1 to an arbitrary point on the oblique surface 20c increases with increasing distance from the arbitrary point to the medium facing surface 30. The angle of inclination of the oblique surface 20c with respect to the direction perpendicular to the medium facing surface 30 (the Y direction) is equal to or approximately equal to the angle of inclination of the first part 17T1 with respect to the direction perpendicular to the medium facing surface 30. The connecting surface 20d is parallel to the medium facing surface 30, for example.

FIG. 1 shows an example in which the distance between the second edge E2 and the medium facing surface 30 is equal to the distance between the medium facing surface 30 and the point at which the third layer 63 of the accommodation part 16 starts to decrease in thickness. The distance between the second edge E2 and the medium facing surface 30 may be smaller or greater, however, than the distance between the medium facing surface 30 and the point at which the third layer 63 of the accommodation part 16 starts to decrease in thickness.

The gap layer 21 is disposed to cover the first part 17T1 of the top surface 17T of the main magnetic pole 17 and the oblique surface 20c, the connecting surface 20d and the top surface 20b of the nonmagnetic layer 20.

The first layer 22A of the main shield 22 has a bottom surface in contact with the gap layer 21. The bottom surface of the first layer 22A bends to be opposed to the main magnetic pole 17 and the nonmagnetic layer 20, with the gap layer 21 interposed between the first layer 22A and each of the main magnetic pole 17 and the nonmagnetic layer 20. The distance between the bottom surface of the first layer 22A and the second part 17T2 is greater than the distance between the bottom surface of the first layer 22A and the first part 17T1.

A manufacturing method for the magnetic head according to the present embodiment will now be described with reference to FIG. 13A to FIG. 26B. FIG. 13A to FIG. 26B each show a stack of layers in the process of manufacturing the magnetic head. The portions lying below the insulating layer 15 are omitted in FIG. 13A to FIG. 26B.

In the manufacturing method for the magnetic head according to the present embodiment, first, the insulating layer 2 and the bottom shield layer 3 are formed in this order on the substrate 1, as shown in FIG. 7. Next, the MR element 5, the two bias magnetic field applying layers 6 and the insulating layer 7 are formed on the bottom shield layer 3. Next, the first top shield layer 8, the nonmagnetic layer 9, the second top shield layer 10 and the insulating layer 11 are formed in this order over the MR element 5, the bias magnetic field applying layers 6 and the insulating layer 7. Next, the coil 12 and the insulating layers 13 and 14 are formed on the insulating layer 11. The coil 12 and the insulating layers 13 and 14 are then flattened at the top by chemical mechanical polishing (hereinafter referred to as CMP), for example. Next, the insulating layer 15 is formed over the top surfaces of the coil 12 and the insulating layers 13 and 14.

Figure 13A:
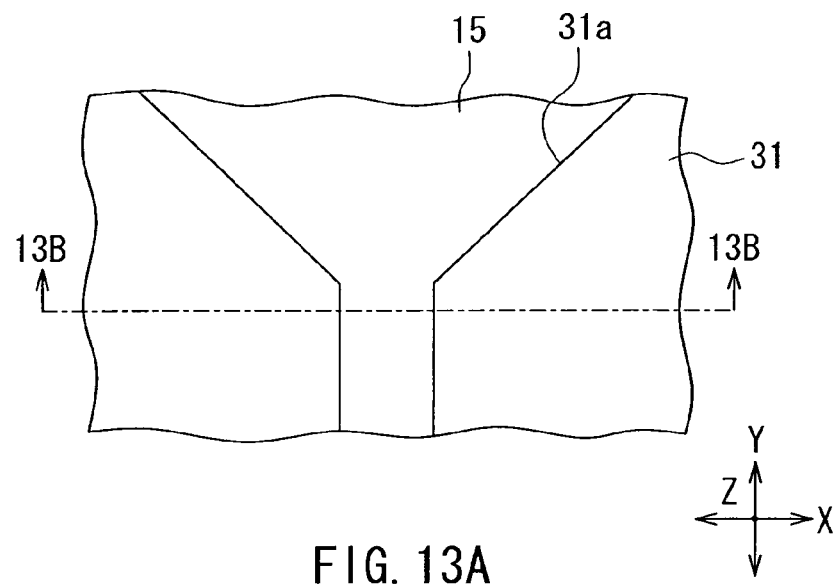
FIG. 13A and FIG. 13B are explanatory diagrams showing a step of a manufacturing method for the magnetic head according to the first embodiment of the invention.
Figure 13B:
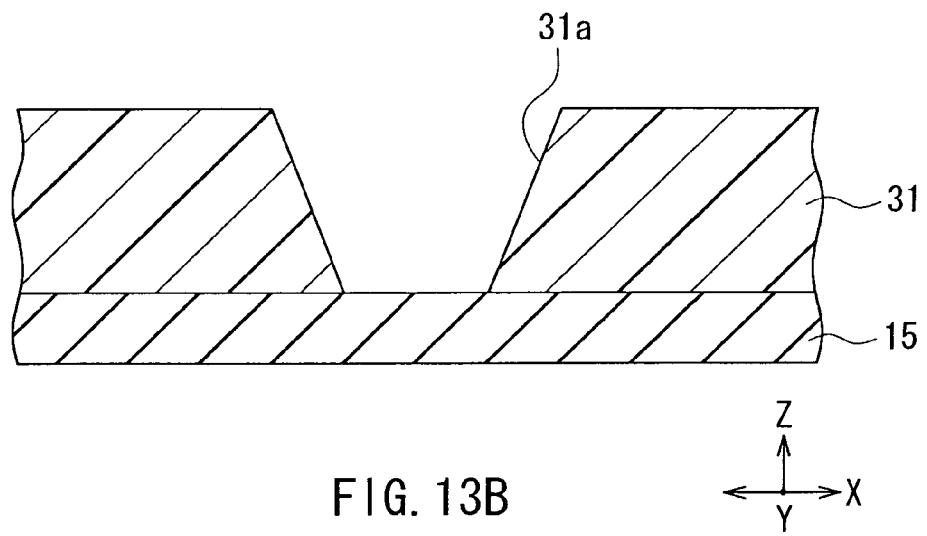

FIG. 13A and FIG. 13B show the next step. FIG. 13A is a plan view of the stack in the process of manufacturing the magnetic head. FIG. 13B shows a cross section taken along line 13B-13B of FIG. 13A. The line 13B-13B indicates the position in the stack of FIG. 13A where the medium facing surface 30 is to be formed later. In this step, first, a photoresist layer is formed on the insulating layer 15. Next, the photoresist layer is patterned by photolithography to form a pattern 31 for forming the accommodation part 16 and the main magnetic pole 17. The pattern 31 has a penetrating opening 31a. The accommodation part 16 and the main magnetic pole 17 are to be formed in the opening 31a later. The opening 31a has two wall faces that decrease in distance from each other with decreasing distance to the top surface of the substrate 1.

Figure 14A:
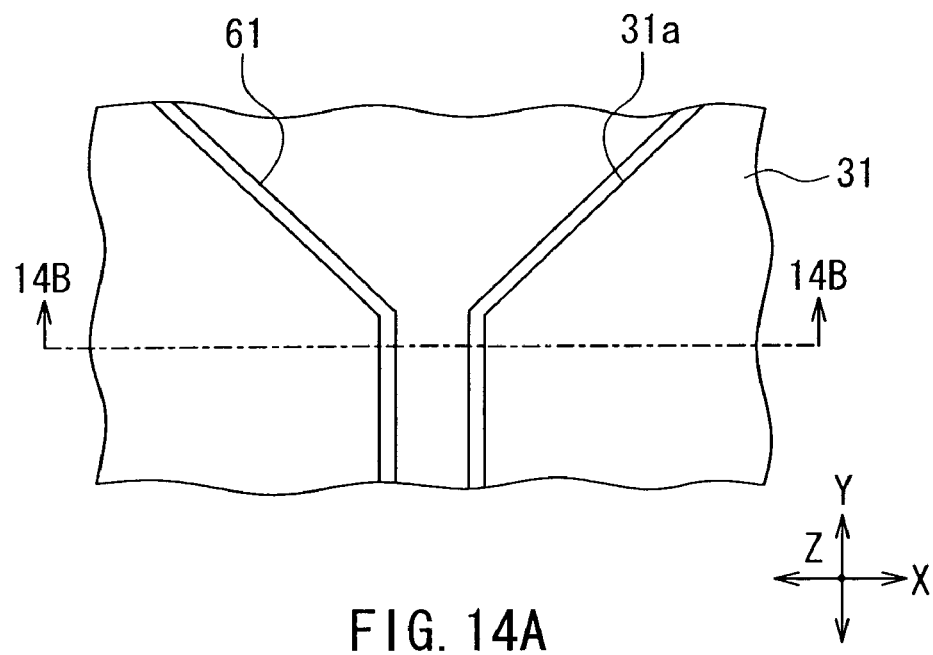
FIG. 14A and FIG. 14B are explanatory diagrams showing a step that follows the step shown in FIG. 13A and FIG. 13B.
Figure 14B:
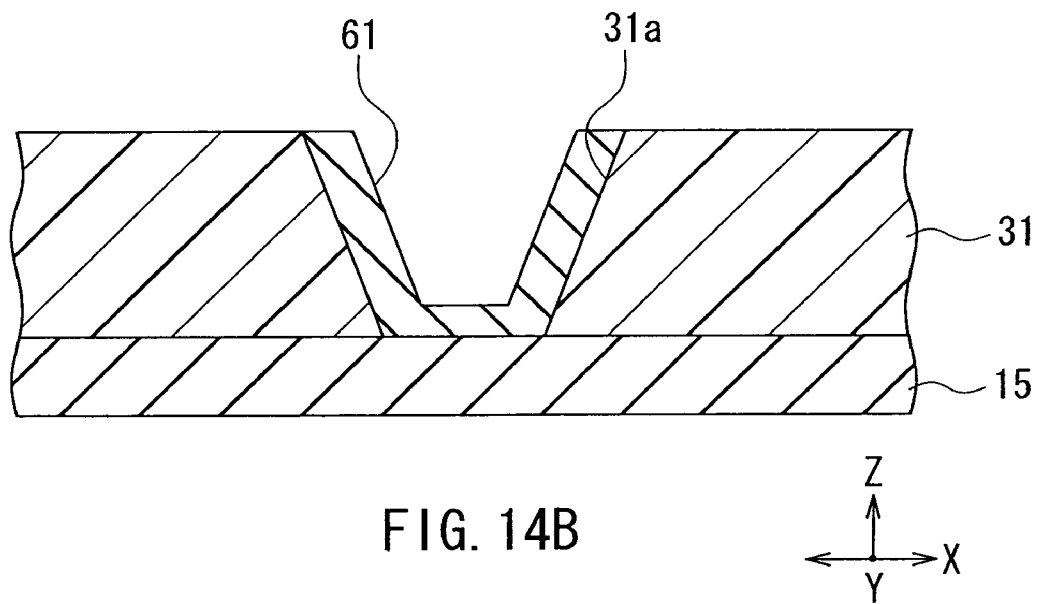

FIG. 14A and FIG. 14B show the next step. FIG. 14A is a plan view of the stack in the process of manufacturing the magnetic head. FIG. 14B shows a cross section taken along line 14B-14B of FIG. 14A. The line 14B-14B indicates the position in the stack of FIG. 14A where the medium facing surface 30 is to be formed later. In this step, the first layer 61 of the accommodation part 16 is formed in the opening 31a. The first layer 61 is preferably formed by a forming method that provides good step coverage. For example, atomic layer deposition (ALD) may be employed as such a forming method.

Figure 15A:
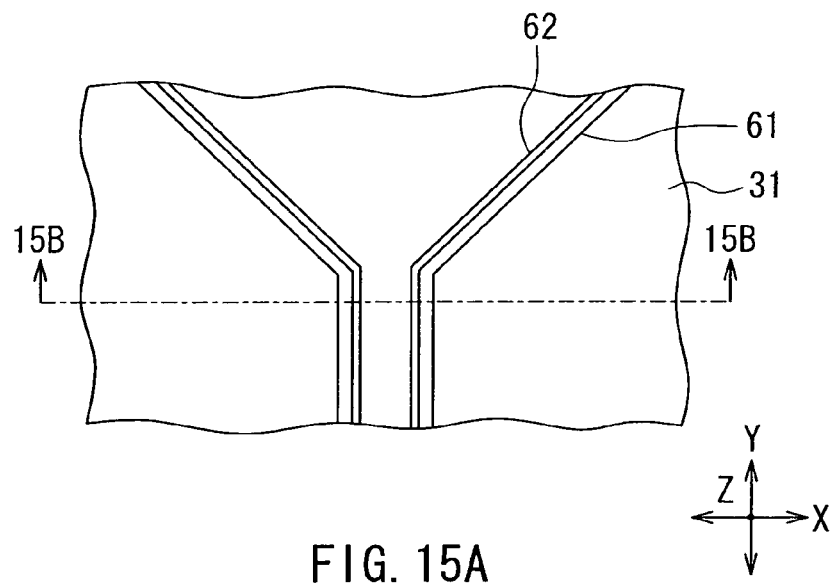
FIG. 15A and FIG. 15B are explanatory diagrams showing a step that follows the step shown in FIG. 14A and FIG. 14B.
Figure 15B:
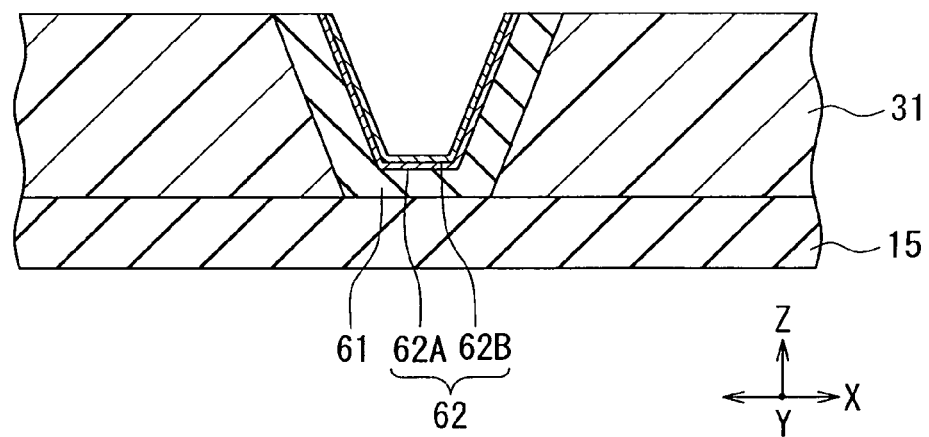

FIG. 15A and FIG. 15B show the next step. FIG. 15A is a plan view of the stack in the process of manufacturing the magnetic head. FIG. 15B shows a cross section taken along line 15B-15B of FIG. 15A. The line 15B-15B indicates the position in the stack of FIG. 15A where the medium facing surface 30 is to be formed later. In this step, the second layer 62 is formed in the groove 61a of the first layer 61 by sputtering, for example. FIG. 15B shows an example in which the second layer 62 is composed of a first film 62A that is in contact with the first layer 61, and a second film 62B that is in contact with the first film 62A so as to be interposed between the first film 62A and the main magnetic pole 17. In this example, the step of forming the second layer 62 includes the step of forming the first film 62A on the first layer 61 and the step of forming the second film 62B on the first film 62A.

Figure 16A:
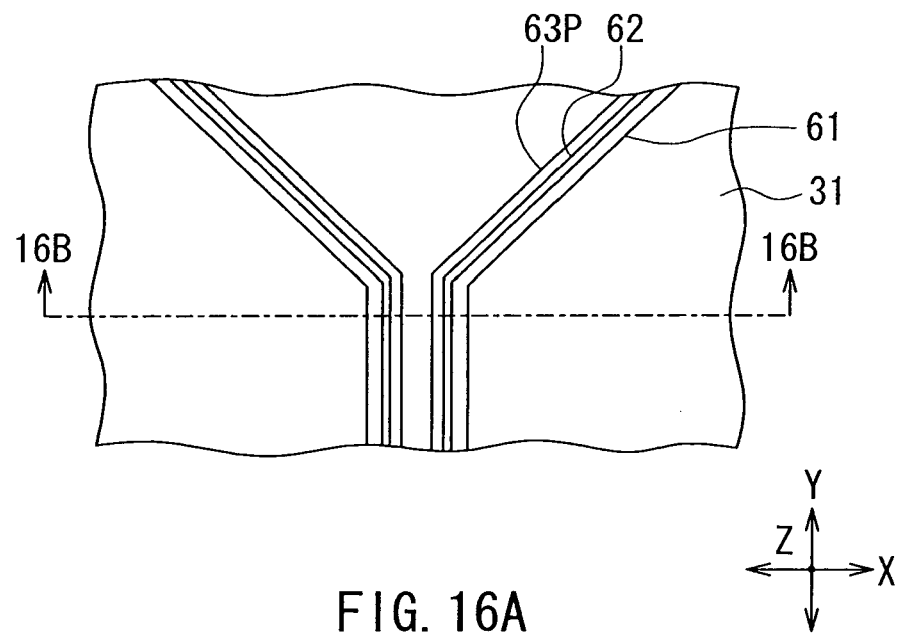
FIG. 16A and FIG. 16B are explanatory diagrams showing a step that follows the step shown in FIG. 15A and FIG. 15B.
Figure 16B:
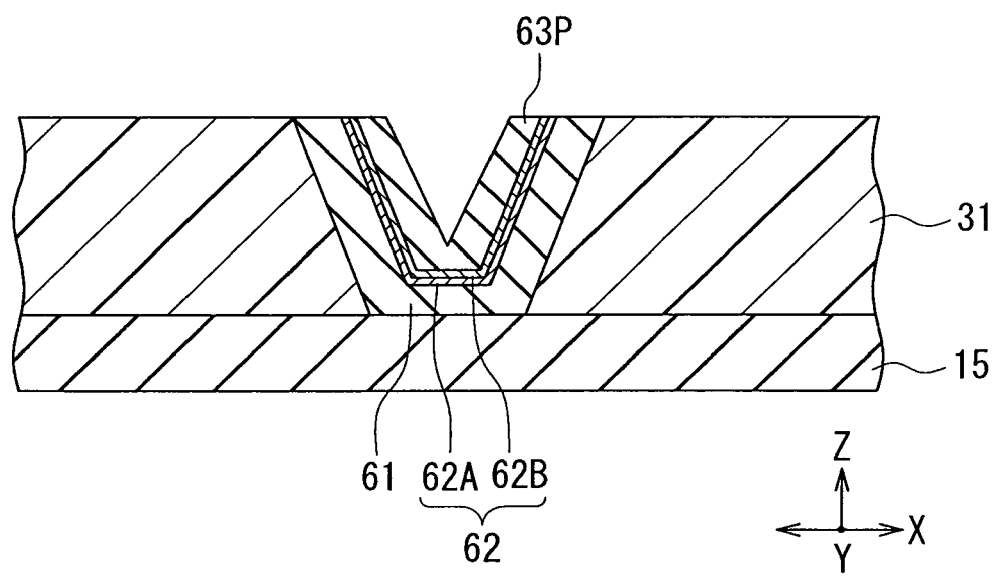

FIG. 16A and FIG. 16B show the next step. FIG. 16A is a plan view of the stack in the process of manufacturing the magnetic head. FIG. 16B shows a cross section taken along line 16B-16B of FIG. 16A. The line 16B-16B indicates the position in the stack of FIG. 16A where the medium facing surface 30 is to be formed later. In this step, an initial third layer 63P is formed to cover the second layer 62. The initial third layer 63P is to be made into the third layer 63 later. The initial third layer 63P is formed of the same inorganic insulating material as that for the third layer 63. The third layer 63 is preferably formed by a forming method that provides good step coverage. Such a forming method can be ALD, for example.

Figure 17A:
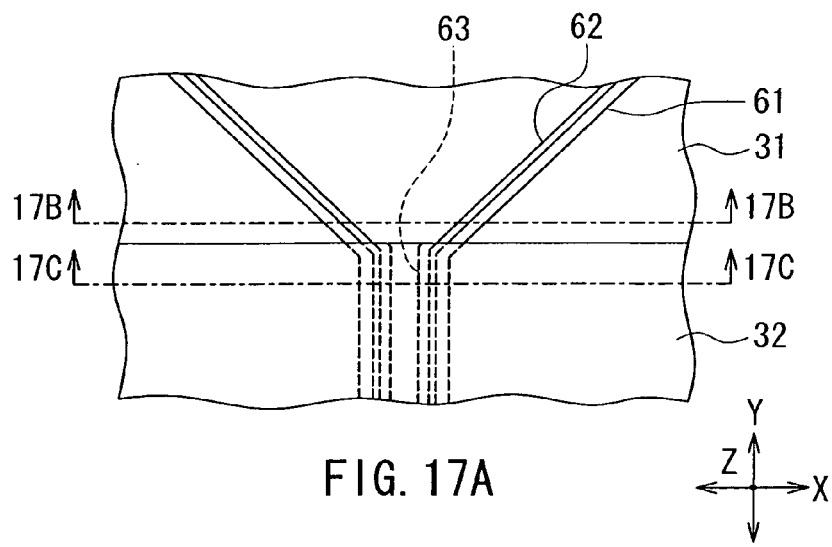
FIG. 17A to FIG. 17C are explanatory diagrams showing a step that follows the step shown in FIG. 16A and FIG. 16B.
Figure 17B:
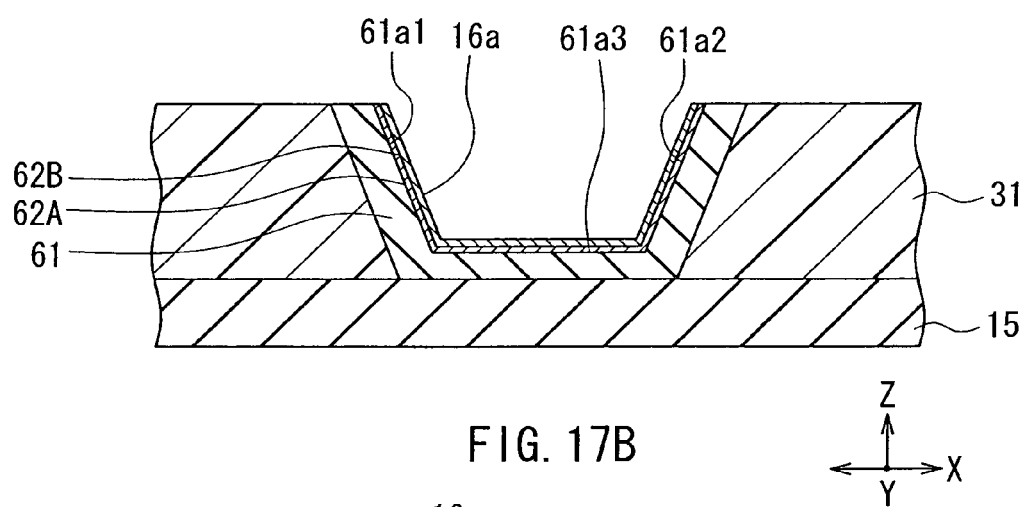
Figure 17C:
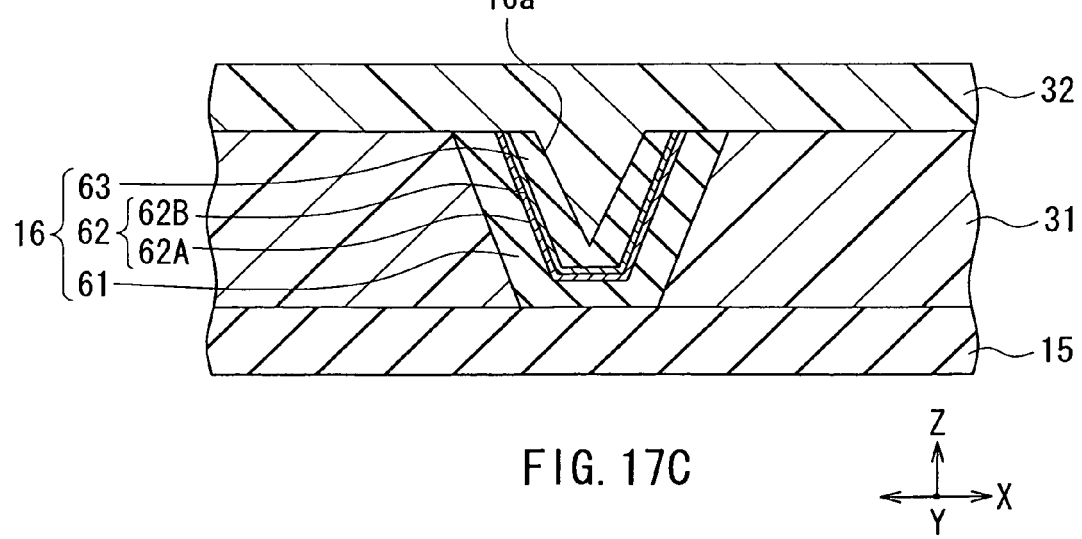

FIG. 17A to FIG. 17C show the next step. FIG. 17A is a plan view of the stack in the process of manufacturing the magnetic head. FIG. 17B shows a cross section taken along line 17B-17B of FIG. 17A. FIG. 17C shows a cross section taken along line 17C-17C of FIG. 17A. The line 17B-17B indicates the position of a cross section of the stack of FIG. 17A in the area where the second part 17B of the main magnetic pole 17 is to be disposed later, the cross section being parallel to the medium facing surface 30. The line 17C-17C indicates the position in the stack of FIG. 17A where the medium facing surface 30 is to be formed later.

In this step, first, an etching mask 32 is formed over the pattern 31, the first layer 61, the second layer 62 and the initial third layer 63P. The etching mask 32 covers the area where the first part 17A of the main magnetic pole 17 is to be disposed later, and does not cover the area where the second part 17B of the main magnetic pole 17 is to be disposed later. The etching mask 32 is formed by patterning a photoresist layer by photolithography.

Next, the initial third layer 63P is etched in part by using the etching mask 32. Specifically, in this etching step, the initial third layer 63P is etched in part so that at least a portion of the initial third layer 63P lying above the bottom surface 61a3 of the groove 61a of the first layer 61 is completely removed from the area where the second part 17B of the main magnetic pole 17 is to be disposed later. Consequently, at least a portion of the second layer 62 lying on the bottom surface 61a3 of the groove 61a of the first layer 61 is exposed in the area where the second part 17B of the main magnetic pole 17 is to be disposed later.

In the area where the second part 17B of the main magnetic pole 17 is to be disposed later, the portions of the initial third layer 63P that adjoin the wall faces 61a1 and 61a2 of the groove 61a of the first layer 61 via the second layer 62 may be completely removed in the foregoing etching step as shown in FIG. 17B, or may be partially etched in the foregoing etching step so as to become thinner than before. Etched in part, the initial third layer 63P becomes the third layer 63. This completes the accommodation part 16.

In the foregoing etching step, the second layer 62 functions as an etching stopper for stopping the progress of etching. In the present embodiment, the second layer 62 is formed of a metal material, and the third layer 63 is formed of an inorganic insulating material. In general, there are many etching conditions where metal materials and inorganic insulating materials have different etching rates. It is therefore easy to select an etching condition such that the second layer 62 functions as an etching stopper. In the foregoing etching step, the second layer 62 preferably has an etching rate lower than or equal to ⅕ that of the initial third layer 63P.

The foregoing etching step is performed by reactive ion etching (hereinafter referred to as RIE) or wet etching, for example.

Where RIE is selected to perform the foregoing etching step, alumina may be used as the inorganic insulating material to form the third layer 63, i.e., the inorganic insulating material to form the initial third layer 63P. Cl ion may be used as the reactive gas ion in RIE, and the second layer 62 may be formed of a material that has an etching resistance higher than that of the third layer 63 (alumina) against Cl ion. Examples of metal materials that have an etching resistance higher than that of alumina against Cl ion include Ru, Ni, Mo, W, Hf, and Zr. The second layer 62 may therefore be formed of any of these materials. If the second layer 62 is to be composed of the first film 62A and the second film 62B, the first film 62A may be formed of one of Ti, Cr, and Ta, and the second film 62B may be formed of one of Ru, Ni, Mo, W, Hf, and Zr. In such a case, the first film 62A functions as an adhesion film for providing the second layer 62 with favorable adhesion to the first layer 61. The second film 62B functions as an etching stopper.

Where wet etching is selected to perform the foregoing etching step, alumina may be used as the inorganic insulating material to form the third layer 63, i.e., the inorganic insulating material to form the initial third layer 63P, and an alkaline etchant may be used for the wet etching. The second layer 62 may be formed of a material that has an etching resistance higher than that of the third layer 63 (alumina) against the etchant. Here, the second layer 62 may have the same configuration as that in the case where RIE is employed for the foregoing etching step.

FIG. 18A to FIG. 18C show the next step. FIG. 18A is a plan view of the stack in the process of manufacturing the magnetic head. FIG. 18B shows a cross section taken along line 18B-18B of FIG. 18A. FIG. 18C shows a cross section taken along line 18C-18C of FIG. 18A. The line 18B-18B indicates the position of a cross section of the stack of FIG. 18A in the area where the second part 17B of the main magnetic pole 17 is to be disposed later, the cross section being parallel to the medium facing surface 30. The line 18C-18C indicates the position in the stack of FIG. 18A where the medium facing surface 30 is to be formed later.

This step forms a magnetic layer 17P which is to be made into the main magnetic pole 17 later. The magnetic layer 17P fills the accommodating groove 16a of the accommodation part 16, and also overlies in part the top surface of the pattern 31. The magnetic layer 17P is formed by electroplating, for example. In such a case, an electrode film that functions as an electrode and a seed layer for plating is initially formed by, for example, sputtering, so as to cover the accommodating groove 16a of the accommodation part 16 and the top surface of the pattern 31. Using the electrode film as an electrode and a seed layer, a plating layer made of a magnetic material is then formed by electroplating. The electrode film may be formed of a magnetic material or a nonmagnetic material. If the electrode film is formed of a magnetic material, the electrode film and the plating layer constitute the magnetic layer 17P. In such a case, the magnetic layer 17P makes contact with the surface of the accommodating groove 16a. It follows that the main magnetic pole 17 formed by the magnetic layer 17P is also in contact with the surface of the accommodating groove 16a. If the electrode film is formed of a nonmagnetic material, the plating layer constitutes the magnetic layer 17P. In such a case, the nonmagnetic electrode film is interposed between the magnetic layer 17P and the surface of the accommodating groove 16a. It follows that the nonmagnetic electrode film is also interposed between the main magnetic pole 17 formed by the magnetic layer 17P and the surface of the accommodating groove 16a.

Figure 19A:
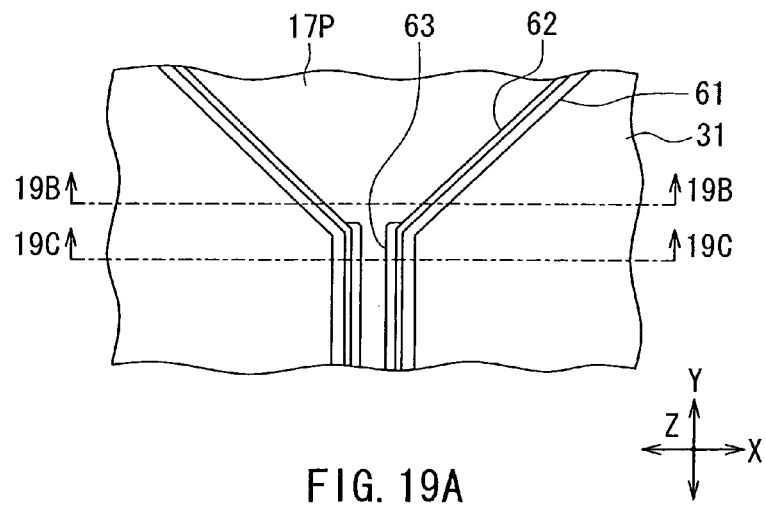
FIG. 19A to FIG. 19C are explanatory diagrams showing a step that follows the step shown in FIG. 18A to FIG. 18C.
Figure 19B:
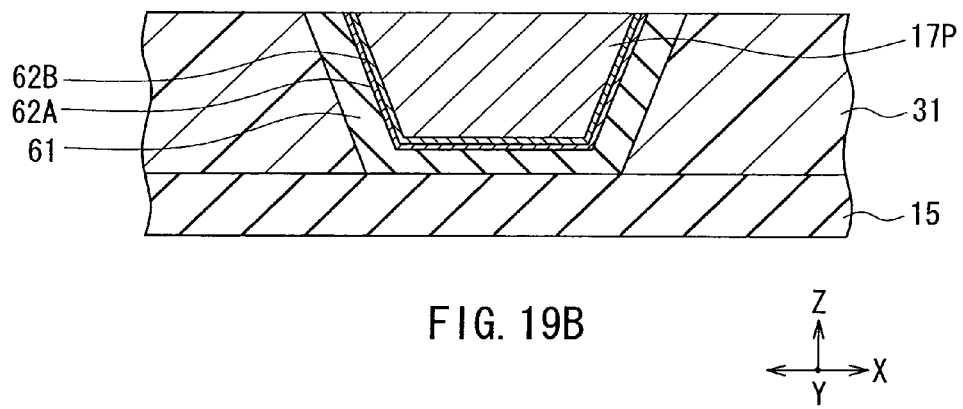
Figure 19C:
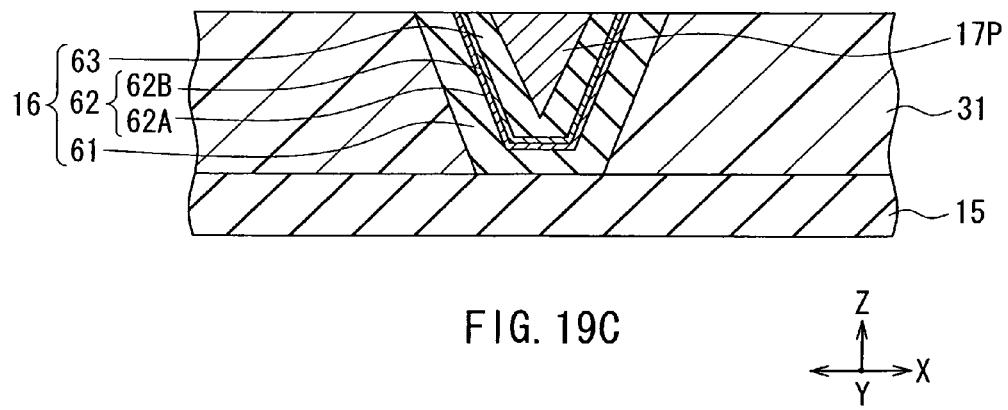

FIG. 19A to FIG. 19C show the next step. FIG. 19A is a plan view of the stack in the process of manufacturing the magnetic head. FIG. 19B shows a cross section taken along line 19B-19B of FIG. 19A. FIG. 19C shows a cross section taken along line 19C-19C of FIG. 19A. The line 19B-19B indicates the position of a cross section of the stack of FIG. 19A in the area where the second part 17B of the main magnetic pole 17 is to be disposed later, the cross section being parallel to the medium facing surface 30. The line 19C-19C indicates the position in the stack of FIG. 19A where the medium facing surface 30 is to be formed later. In this step, the magnetic layer 17P is polished by, for example, CMP, until the top surface of the pattern 31 is exposed.

FIG. 20 shows the next step. FIG. 20 is a cross-sectional view showing a cross section of the stack in the process of manufacturing the magnetic head, taken at the position where the medium facing surface 30 is to be formed. In this step, the pattern 31 is removed.

FIG. 21 shows the next step. FIG. 21 is a cross-sectional view showing a cross section of the stack in the process of manufacturing the magnetic head, taken at the position where the medium facing surface 30 is to be formed. In this step, a magnetic layer 18P is formed by frame plating, for example. The magnetic layer 18P is to be polished and etched later into the two side shield layers 18. Next, the insulating layer 19 (see FIG. 4) is formed around the magnetic layer 18P.

FIG. 22 shows the next step. FIG. 22 is a cross-sectional view showing a cross section of the stack in the process of manufacturing the magnetic head, taken at the position where the medium facing surface 30 is to be formed. In this step, the magnetic layer 18P and the insulating layer 19 are polished by, for example, CMP, until the top surface of the magnetic layer 17P is exposed. Alternatively, the magnetic layer 18P and the insulating layer 19 may be first flattened at the top by CMP and then etched by ion milling, for example, until the top surface of the magnetic layer 17P is exposed.

Figure 23A:
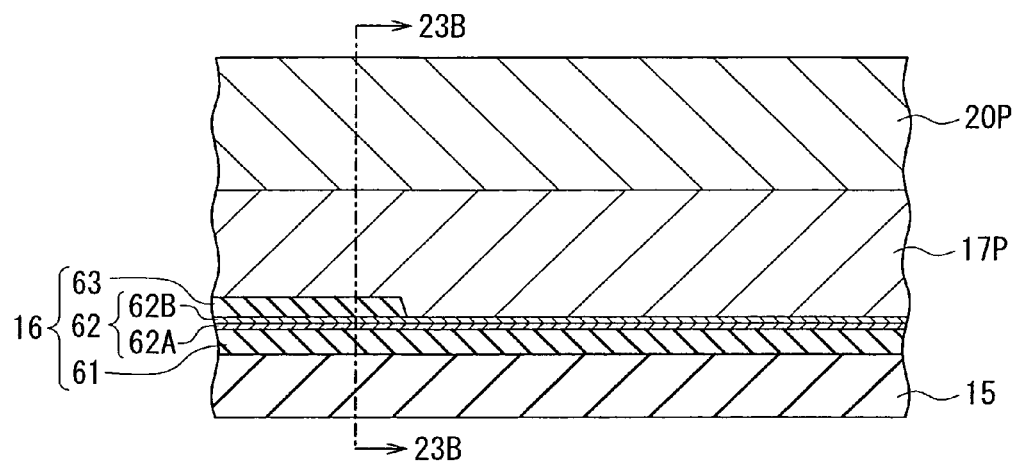
FIG. 23A and FIG. 23B are explanatory diagrams showing a step that follows the step shown in FIG. 22.
Figure 23B:
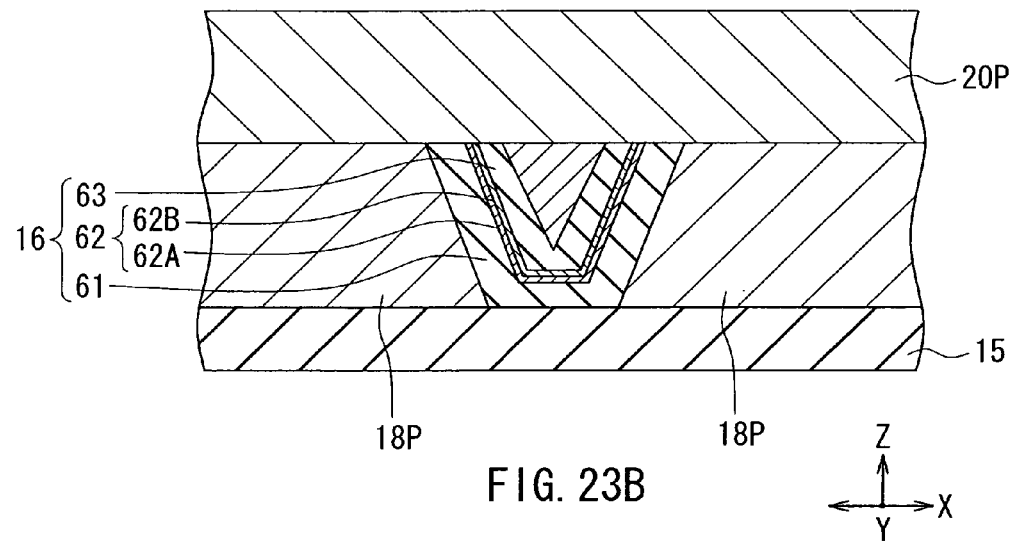

FIG. 23A and FIG. 23B show the next step. FIG. 23A is a cross-sectional view showing a cross section of the stack in the process of manufacturing the magnetic head, the cross section being perpendicular to the medium facing surface and the top surface of the substrate. FIG. 23B shows a cross section taken along line 23B-23B of FIG. 23A. The line 23B-23B indicates the position in the stack of FIG. 23A where the medium facing surface 30 is to be formed later. In this step, a to-be-etched layer 20P, which is to be made into the nonmagnetic layer 20 later, is formed over the accommodation part 16, the magnetic layer 17P and the magnetic layer 18P by frame plating, for example.

Figure 24A:
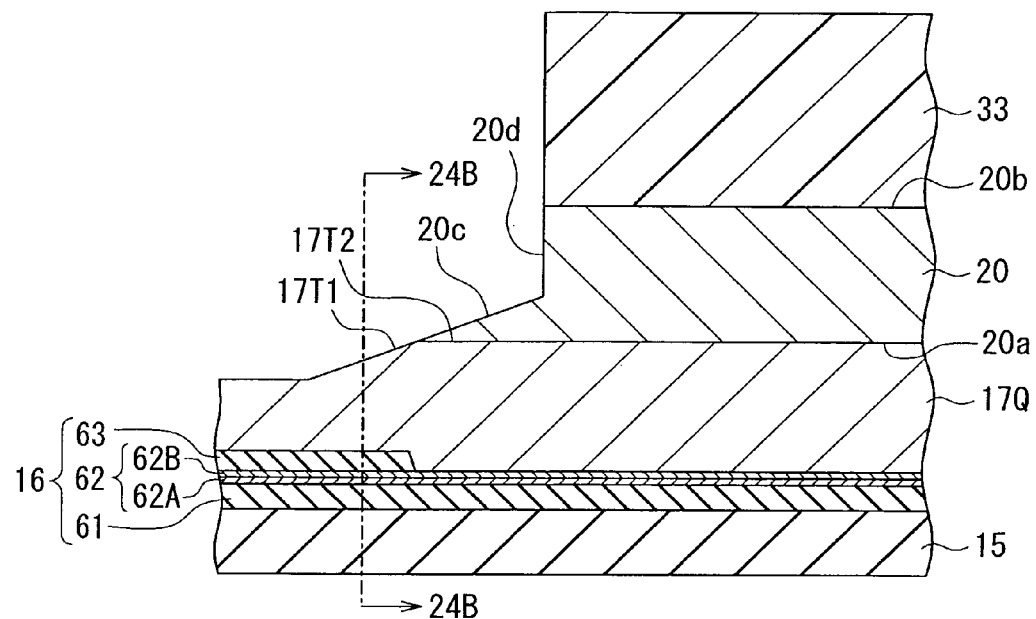
FIG. 24A and FIG. 24B are explanatory diagrams showing a step that follows the step shown in FIG. 23A and FIG. 23B.
Figure 24B:
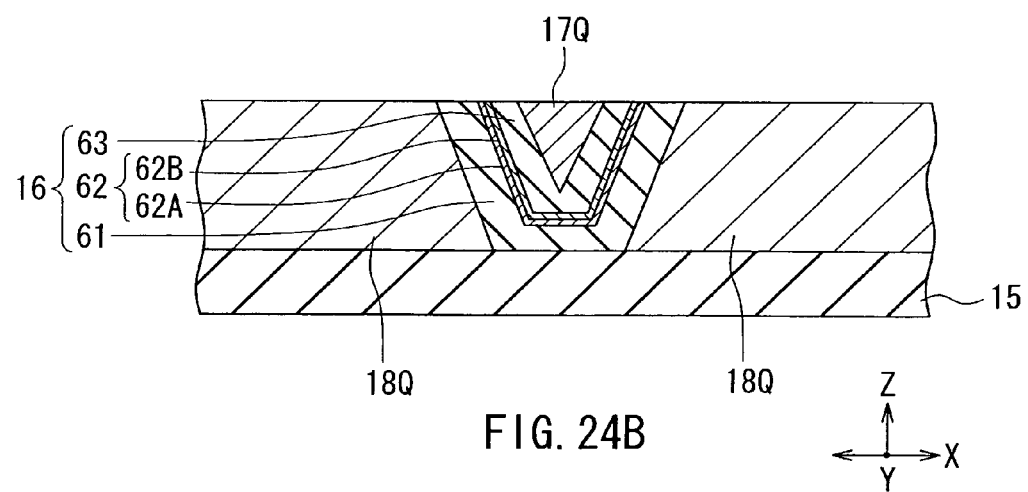

FIG. 24A and FIG. 24B show the next step. FIG. 24A is a cross-sectional view showing a cross section of the stack in the process of manufacturing the magnetic head, the cross section being perpendicular to the medium facing surface and the top surface of the substrate. FIG. 24B shows a cross section taken along line 24B-24B of FIG. 24A. The line 24B-24B indicates the position in the stack of FIG. 24A where the medium facing surface 30 is to be formed later. In this step, first, an etching mask 33 is formed on the to-be-etched layer 20P. The etching mask 33 covers a part of the top surface of the to-be-etched layer 20P that is to be made into the top surface 20b of the nonmagnetic layer 20. The etching mask 33 is formed by patterning a photoresist layer by photolithography.

Next, a part of the to-be-etched layer 20P that is not covered with the etching mask 33 and a part of each of the top surfaces of the magnetic layers 17P and 18P are etched by ion milling, for example. This etching provides the to-be-etched layer 20P with the oblique surface 20c and the connecting surface 20d as shown in FIG. 24A, thereby making the to-be-etched layer 20P into the nonmagnetic layer 20. Of the top surface of the magnetic layer 17P, the etched part becomes the first part 17T1 and the other part becomes the second part 17T2. The etched magnetic layers 17P and 18P will be referred to as magnetic layers 17Q and 18Q, respectively. The etching is preferably performed so that the oblique surface 20c and the first part 17T1 are continuous with each other and that the oblique surface 20c and the first part 17T1 have the same or almost the same angles of inclination with respect to the direction perpendicular to the medium facing surface 30 (the Y direction). It is therefore preferred that the to-be-etched layer 20P (the nonmagnetic layer 20) have approximately the same etching rate as that of the magnetic layer 17P for ion milling. For example, if the magnetic layer 17P is formed of CoFe, the to-be-etched layer 20P (the nonmagnetic layer 20) may be formed of a Ru layer or a stack of Ti, Ru and Ti layers so that the nonmagnetic layer 20 has approximately the same etching rate as that of the magnetic layer 17P for ion milling.

Figure 25A:
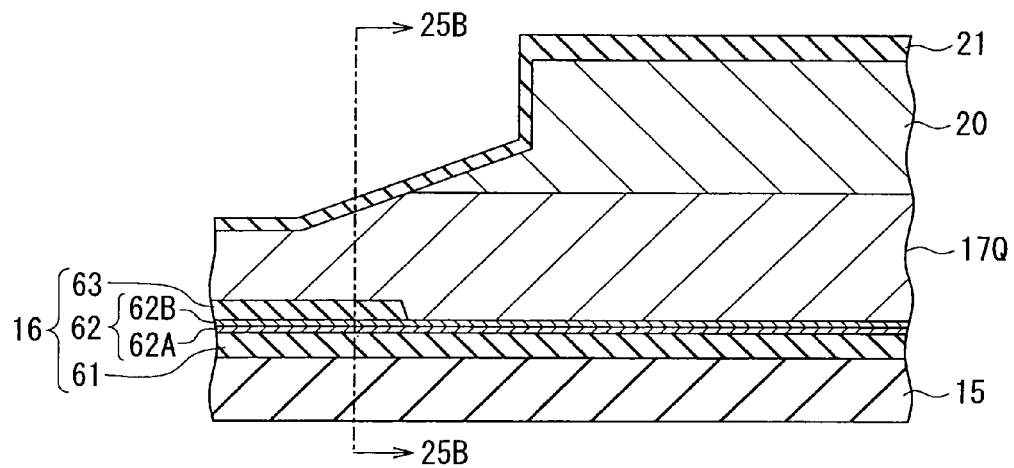
FIG. 25A and FIG. 25B are explanatory diagrams showing a step that follows the step shown in FIG. 24A and FIG. 24B.
Figure 25B:
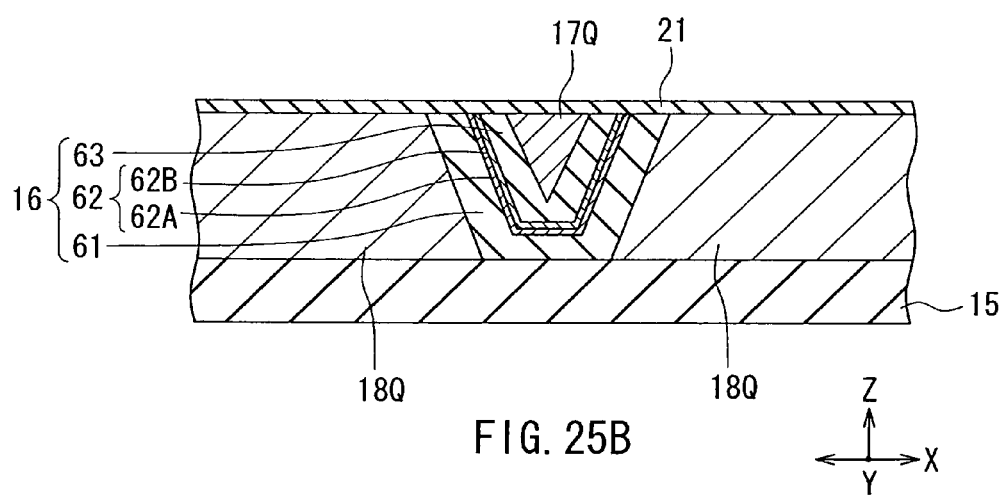

FIG. 25A and FIG. 25B show the next step. FIG. 25A is a cross-sectional view showing a cross section of the stack in the process of manufacturing the magnetic head, the cross section being perpendicular to the medium facing surface and the top surface of the substrate. FIG. 25B shows a cross section taken along line 25B-25B of FIG. 25A. The line 25B-25B indicates the position in the stack of FIG. 25A where the medium facing surface 30 is to be formed later. In this step, the gap layer 21 is formed over the accommodation part 16, the magnetic layers 17Q and 18Q and the nonmagnetic layer 20.

Figure 26A:
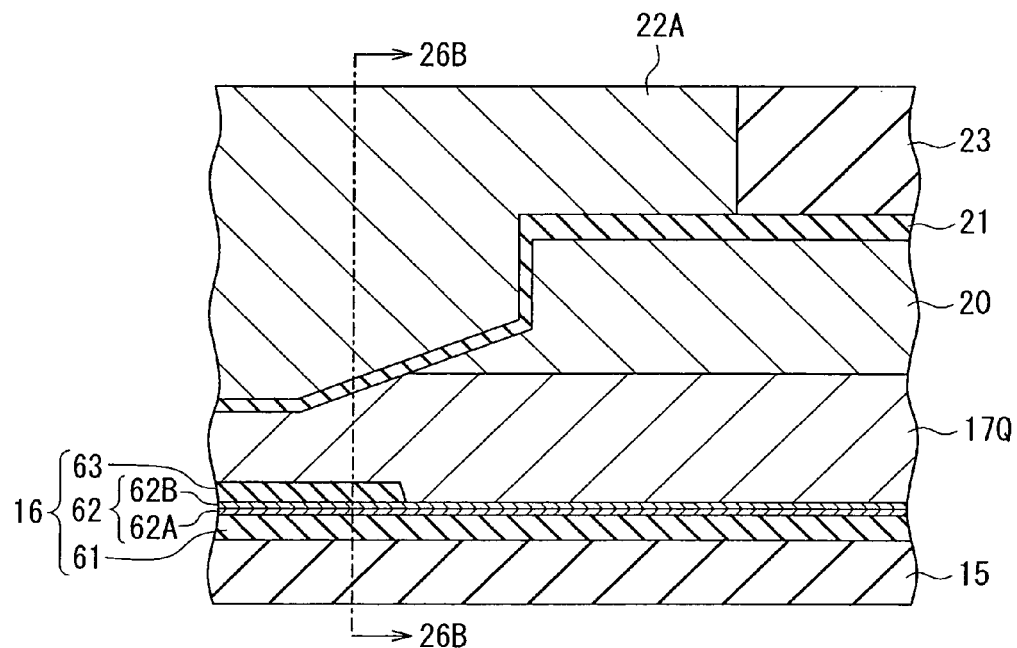
FIG. 26A and FIG. 26B are explanatory diagrams showing a step that follows the step shown in FIG. 25A and FIG. 25B.
Figure 26B:
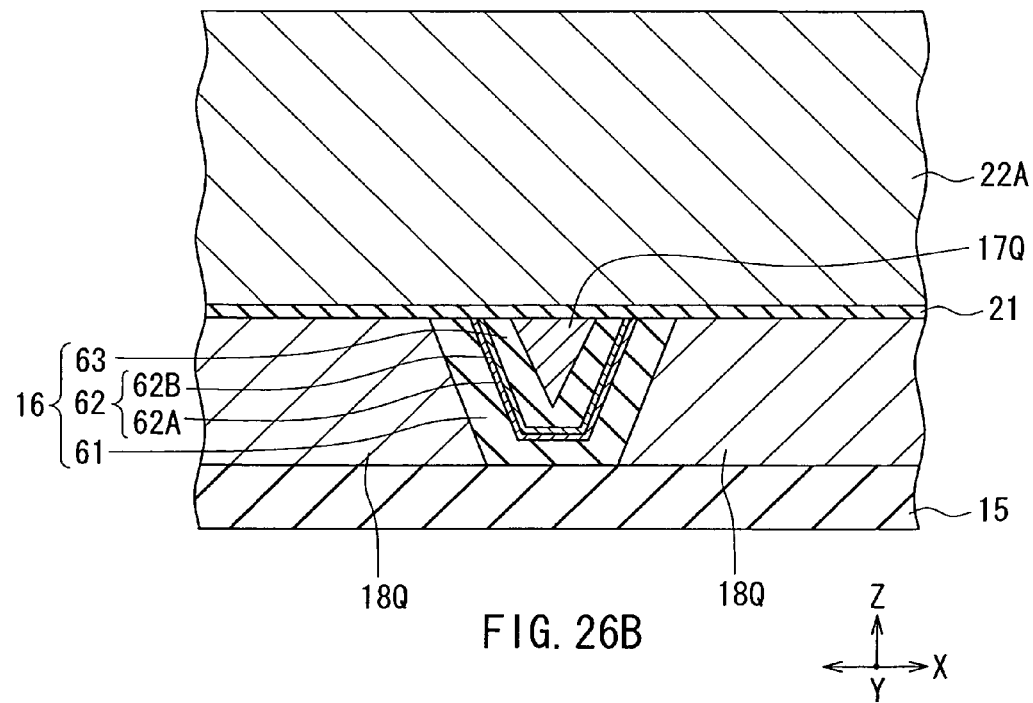

FIG. 26A and FIG. 26B show the next step. FIG. 26A is a cross-sectional view showing a cross section of the stack in the process of manufacturing the magnetic head, the cross section being perpendicular to the medium facing surface and the top surface of the substrate. FIG. 26B shows a cross section taken along line 26B-26B of FIG. 26A. The line 26B-26B indicates the position in the stack of FIG. 26A where the medium facing surface 30 is to be formed later. In this step, first, the first layer 22A is formed on the gap layer 21, and the yoke layer 22B (see FIG. 7) is formed on the magnetic layer 17Q, each by frame plating, for example. Next, the nonmagnetic layer 23 is formed over the entire top surface of the stack. The nonmagnetic layer 23 is then polished by, for example, CMP, until the first layer 22A and the yoke layer 22B are exposed. The first layer 22A, the yoke layer 22B and the nonmagnetic layer 23 are thereby flattened at the top.

Next, as shown in FIG. 7, the insulating layer 24 is formed over the areas of the top surfaces of the yoke layer 22B and the nonmagnetic layer 23 above which the coil 25 is to be disposed. The coil 25 is then formed by, for example, frame plating, such that at least a part of the coil 25 lies on the insulating layer 24. Next, the insulating layer 26 is formed to cover the coil 25. Next, the second layer 22C is formed by frame plating, for example. The main shield 22 is thereby completed.

Next, the protection layer 27 is formed to cover the entire top surface of the stack as shown in FIG. 7. Wiring, terminals, and other components are then formed on the protection layer 27. Next, the substrate 1 is cut near the position where the medium facing surface 30 is to be formed, and the cut surface is polished into the medium facing surface 30. Flying rails and other components are formed further to complete the magnetic head. When the medium facing surface 30 is formed, the magnetic layer 17Q becomes the main magnetic pole 17 and the magnetic layer 18Q becomes the two side shield layers 18.

The function and effects of the magnetic head according to the present embodiment will now be described. The magnetic head records data on the recording medium by using the recording head, and reproduces data recorded on the recording medium by using the reproducing head. In the recording head, the coil 25 produces a magnetic field corresponding to data to be recorded on the recording medium. The main magnetic pole 17 allows a magnetic flux corresponding to the magnetic field produced by the coil 25 to pass, and produces a recording magnetic field for recording data on the recording medium by means of the perpendicular magnetic recording system.

The magnetic head according to the present embodiment includes the accommodation part 16 having the accommodating groove 16a that accommodates the main magnetic pole 17. The main magnetic pole 17 includes the first part 17A that extends from the medium facing surface 30 to a point at a predetermined distance H from the medium facing surface 30, and the second part 17B other than the first part 17A.

The accommodation part 16 includes the first layer 61 having the groove 61a, the second layer 62 located in the groove 61a of the first layer 61 so as to lie between the first layer 61 and the main magnetic pole 17, and the third layer 63 located in the groove 61a of the first layer 61 so as to be interposed in part between the second layer 62 and the main magnetic pole 17. The groove 61a of the first layer 61 has the first and second wall faces 61a1 and 61a2 that are located on both sides of the main magnetic pole 17 opposite to each other in the track width direction, and the bottom surface 61a3 that connects the first and second wall faces 61a1 and 61a2 to each other. The second layer 62 is formed of a metal material different from the material used to form the first layer 61. The third layer 63 is formed of an inorganic insulating material.

The second layer 62 and the third layer 63 lie between the first layer 61 and the first part 17A. The second layer 62 lies between the bottom surface 61a3 of the groove 61a of the first layer 61 and the second part 17B, but the third layer 63 does not lie between them. The distance between the bottom surface 61a3 of the groove 61a of the first layer 61 and the second part 17B is smaller than that between the bottom surface 61a3 and the first part 17A by the difference in level D.

The distance from the second part 17B to each of the first and second wall faces 61a1 and 61a2 of the groove 61a of the first layer 61 is smaller than the distance from the first part 17A to each of the first and second wall faces 61a1 and 61a2.

With the accommodation part 16 and the main magnetic pole 17 of such a configuration, the second part 17B is larger in thickness (dimension in the Z direction) and width (dimension in the X direction) than the first part 17A at the boundary between the first part 17A and the second part 17B. In other words, the cross section of the second part 17B perpendicular to the direction of flow of the magnetic flux (the Y direction) has a larger area than that of the first part 17A at the boundary between the first part 17A and the second part 17B. According to the present embodiment, it is thus possible to introduce a large amount of magnetic flux to the medium facing surface 30 through the main magnetic pole 17 by virtue of the increased area of the cross section of the second part 17B of the main magnetic pole 17 perpendicular to the direction of flow of the magnetic flux, without increasing the area of the end face of the first part 17A of the main magnetic pole 17 located in the medium facing surface 30. The present embodiment thus allows the suppression of adjacent track erase or wide-range adjacent track erase for improved recording density, and allows the improvement of overwrite property at the same time.

The adjacent track erase or wide-range adjacent track erase and the overwrite property are affected by the shape of the main magnetic pole 17, or more particularly, the position of the boundary between the first part 17A and the second part 17B and the difference in level D. Aside from the shape of the main magnetic pole 17, the adjacent track erase or wide-range adjacent track erase and the overwrite property are also affected by the use environment of the magnetic head such as the characteristics of the recording medium, the intensity of the recording current, and the magnitude of the overshoot of the recording current. Thus, in order to achieve the suppression of adjacent track erase or wide-range adjacent track erase and the improvement of overwrite property at the same time, it is necessary to precisely control the shape of the main magnetic pole 17 in consideration of the balance between the suppression of wide-range adjacent track erase and the improvement of overwrite property, depending on the use environment of the magnetic head.

In the present embodiment, the position of the boundary between the first part 17A and the second part 17B is accurately controllable by the position of an end of the third layer 63 farther from the medium facing surface 30, the end being of the part of the third layer 63 that lies above the bottom surface 61a3 of the groove 61a of the first layer 61. In the present embodiment, the difference between the distance from the bottom surface 61a3 of the groove 61a of the first layer 61 to the second part 17B and the distance from the bottom surface 61a3 to the first part 17A, i.e., the difference in level D, is also accurately controllable by the thickness of the third layer 63. Consequently, according to the present embodiment, it is possible to precisely control the shape of the main magnetic pole 17 that allows improvements in recording density and overwrite property as described above.

The manufacturing method for the magnetic head according to the present embodiment includes the steps of forming the accommodation part 16; forming the main magnetic pole 17 after the step of forming the accommodation part 16; and forming the coil 25. The step of forming the accommodation part 16 includes the steps of: forming the first layer 61; forming the second layer 62 in the groove 61a of the first layer 61; forming the initial third layer 63P to cover the second layer 62, the initial third layer 63P being intended to be made into the third layer 63 later; and etching the initial third layer 63P in part so as to make the initial third layer 63P into the third layer 63. In the step of etching the initial third layer 63P in part, the second layer 62 functions as an etching stopper for stopping the progress of etching. According to the present embodiment, it is thus possible to precisely control the shape of the main magnetic pole 17, or the difference in level D in particular.

Figure 27:
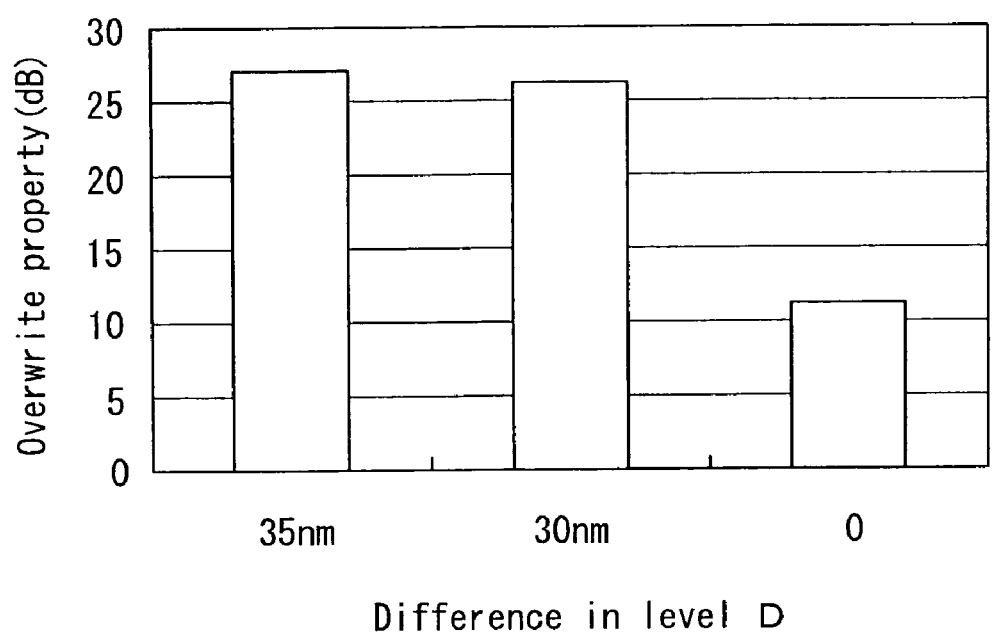
FIG. 27 is a characteristic chart showing experimental results for explaining the effect of the magnetic head according to the first embodiment of the invention.

Referring to FIG. 27, a description will now be given of experimental results that show the effect of the magnetic head according to the present embodiment. In this experiment, the following three types of magnetic heads were fabricated and compared for the overwrite property. First and second types of magnetic heads had the configuration of the magnetic head according to the present embodiment. The first type of magnetic head was a practical example of the magnetic head with a difference in level D of 35 nm. The second type of magnetic head was a practical example of the magnetic head with a difference in level D of 30 nm. A third type of magnetic head was a comparative example. In the third type of magnetic head, the third layer 63 of the accommodation part 16 was interposed between the entire groove 61a of the first layer 61 and both of the first and second parts 17A and 17B, with zero difference in level D.

FIG. 27 shows the overwrite properties of the foregoing first to third types of magnetic heads. The first type of magnetic head with a difference in level D of 35 nm showed an overwrite property of 27.1 dB. The second type of magnetic head with a difference in level D of 30 nm showed an overwrite property of 26.1 dB. The third type of magnetic head with a difference in level D of 0 nm showed an overwrite property of 11.3 dB. The experimental results show that the present embodiment improves the overwrite property as compared with the case of zero difference in level D.

Other functions and effects of the magnetic head according to the present embodiment will now be described. In the present embodiment, as shown in FIG. 2, the end face of the first part 17A of the main magnetic pole 17 located in the medium facing surface 30 decreases in width with decreasing distance to the top surface of the substrate 1. The present embodiment thereby makes it possible to suppress the adjacent track erase or wide-range adjacent track erase resulting from a skew.

In the present embodiment, as shown in FIG. 1, the top surface 17T of the main magnetic pole 17 includes the first part 17T1 and the second part 17T2. The distance from the top surface of the substrate 1 to an arbitrary point on the first part 17T1 increases with increasing distance from the arbitrary point to the medium facing surface 30. Consequently, according to the present embodiment, the end face of the first part 17A of the main magnetic pole 17 located in the medium facing surface 30 can be reduced in size in the Z direction. This allows the suppression of adjacent track erase or wide-range adjacent track erase resulting from a skew. Furthermore, the present embodiment allows the improvement of overwrite property since the main magnetic pole 17 is capable of introducing a large amount of magnetic flux to the medium facing surface 30.

In the present embodiment, as shown in FIG. 1, the distance between the first layer 22A of the main shield 22 and the second part 17T2 of the top surface 17T of the main magnetic pole 17 is greater than that between the first layer 22A of the main shield 22 and the first part 17T1 of the top surface 17T of the main magnetic pole 17. According to the present embodiment, the main magnetic pole 17 and the main shield 22 are opposed to each other via the gap layer 21 only across a small area. This serves to prevent the main shield 22 from being saturated with the magnetic field leaking from the main magnetic pole 17. Consequently, according to the present embodiment, it is possible to increase the gradient of the recording magnetic field by the function of the main shield 22.

Second Embodiment

Figure 28:
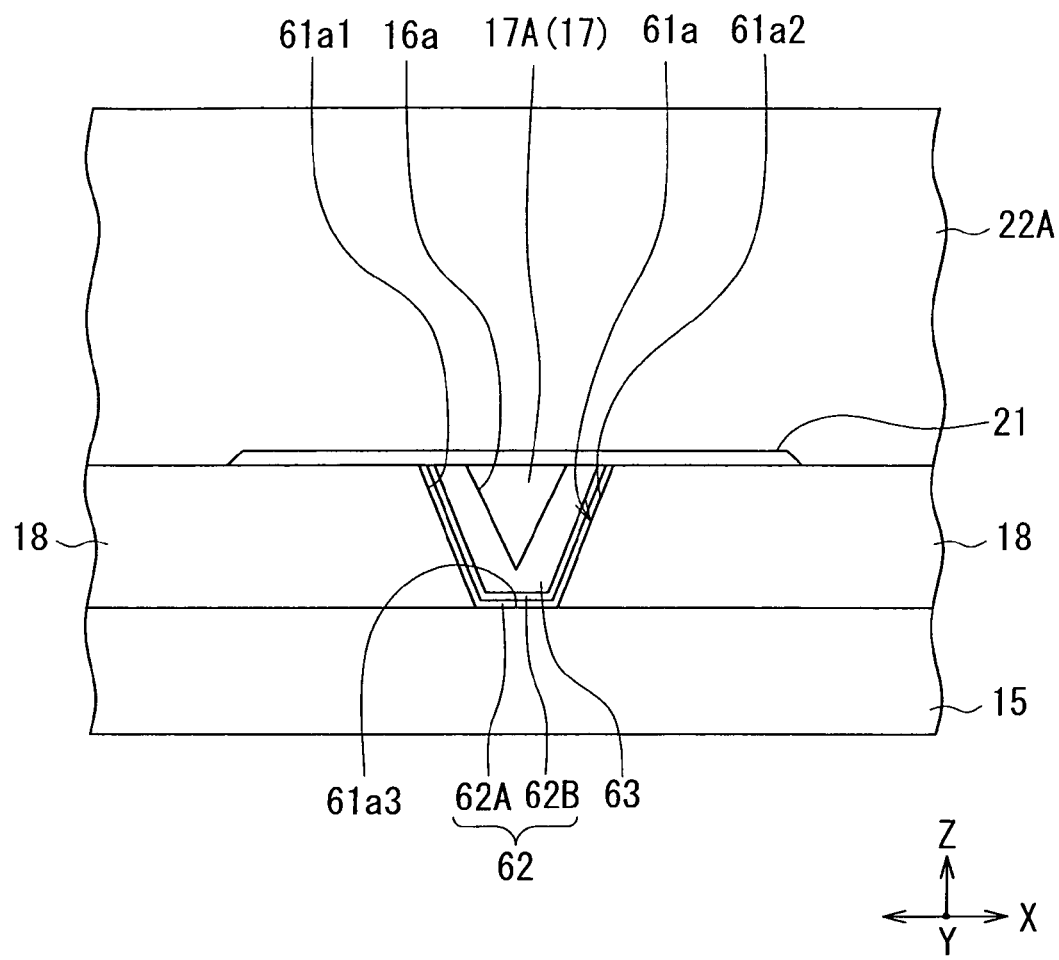
FIG. 28 is a front view showing a part of the medium facing surface of a magnetic head according to a second embodiment of the invention.

A second embodiment of the present invention will now be described. First, a description will be given of the configuration of the magnetic head according to the present embodiment with reference to FIG. 28. FIG. 28 is a front view showing a part of the medium facing surface 30 of the magnetic head according to the present embodiment. The magnetic head according to the present embodiment does not have the first layer 61 of the first embodiment. In the present embodiment, the groove 61a is formed by the insulating layer 15 and the two side shield layers 18. The second layer 62, the third layer 63 and the main magnetic pole 17 are accommodated in the groove 61a. As will be described later, in the manufacturing method for the magnetic head according to the present embodiment, a space corresponding to the groove 61a is formed by the insulating layer 15 and a pattern of photoresist formed on the insulating layer 15, and then the second layer 62, the third layer 63 and the main magnetic pole 17 are accommodated in the space. Then, the pattern is removed and the two side shield layers 18 are formed around the second layer 62, the third layer 63 and the main magnetic pole 17. Consequently, the groove 61a is formed by the insulating layer 15 and the two side shield layers 18.

In the present embodiment, the insulating layer 15 and the two side shield layers 18 correspond to the first layer of the accommodation part according to the present invention. The first layer of the present embodiment has a bottom-forming part that forms the bottom surface 61a3 of the groove 61a of the first layer, and first and second wall-face-forming parts that respectively form the first and second wall faces 61a1 and 61a2 of the groove 61a of the first layer. The insulating layer 15 corresponds to the bottom-forming part. The two side shield layers 18 correspond to the first and second wall-face-forming parts. Specifically, the bottom surface 61a3 is formed by the top surface of the insulating layer 15, and the first and second wall faces 61a1 and 61a2 are formed by the respective surfaces of the two side shield layers 18 that face toward the second layer 62, the third layer 63 and the main magnetic pole 17. The second layer 62 is formed of a metal material different from the material of each of the insulating layer 15 and the side shield layers 18.

The manufacturing method for the magnetic head according to the present embodiment will now be described with reference to FIG. 29 to FIG. 31. The manufacturing method for the magnetic head according to the present embodiment is the same as that for the magnetic head according to the first embodiment up to the step of forming the insulating layer 15. The step of forming the insulating layer 15 of the present embodiment corresponds to the step of forming the bottom-forming part according to the present invention.

Figure 29:
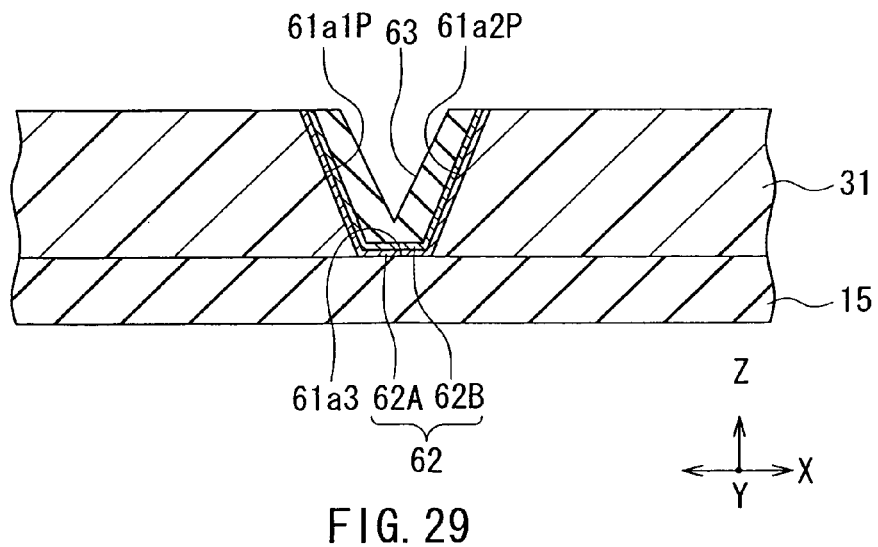
FIG. 29 is an explanatory diagram showing a step of a manufacturing method for the magnetic head according to the second embodiment of the invention.

FIG. 29 shows the next step. FIG. 29 is a cross-sectional view showing a cross section of the stack in the process of manufacturing the magnetic head, taken at the position where the medium facing surface 30 is to be formed. In this step, first, a photoresist layer is formed on the insulating layer 15. The photoresist layer is then patterned by photolithography to thereby form a pattern 31 for forming the second layer 62, the third layer 63 and the main magnetic pole 17. The pattern 31 has a penetrating opening. The opening has first and second preliminary wall faces 61a1P and 61a2P having shapes the same as those of the first and second wall faces 61a1 and 61a2. The pattern 31 corresponds to the preliminary wall-face-forming part according to the present invention. The step of forming the pattern 31 corresponds to the step of forming the preliminary wall-face-forming part according to the present invention. Next, the second layer 62 and the third layer 63 are formed in a space formed by the first and second preliminary wall faces 61a1P and 61a2P and the bottom surface 61a3 which is formed by the insulating layer 15. The second layer 62 and the third layer 63 are formed in the same way as the first embodiment.

Figure 30:
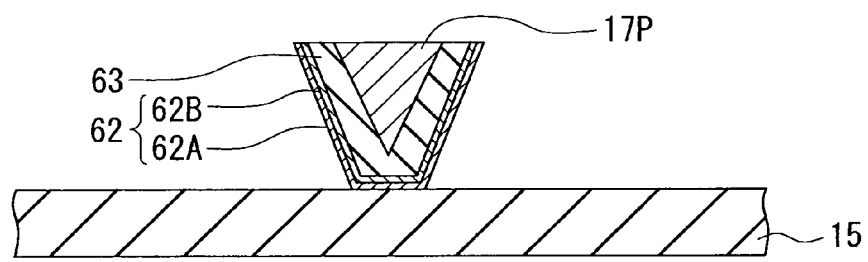
FIG. 30 is a cross-sectional view showing a step that follows the step shown in FIG. 29.

FIG. 30 shows the next step. FIG. 30 is a cross-sectional view showing a cross section of the stack in the process of manufacturing the magnetic head, taken at the position where the medium facing surface 30 is to be formed. In this step, the magnetic layer 17P is formed and then the pattern 31 is removed, as in the steps of FIG. 18A to FIG. 20 of the first embodiment. The step of removing the pattern 31 of the present embodiment corresponds to the step of removing the preliminary wall-face-forming part according to the present invention.

Figure 31:
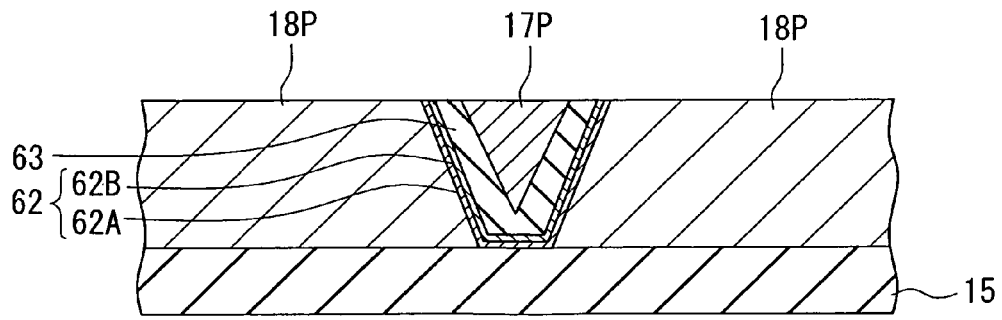
FIG. 31 is a cross-sectional view showing a step that follows the step shown in FIG. 30.

FIG. 31 shows the next step. FIG. 31 is a cross-sectional view showing a cross section of the stack in the process of manufacturing the magnetic head, taken at the position where the medium facing surface 30 is to be formed. In this step, the magnetic layer 18P is formed as in the steps of FIG. 21 and FIG. 22 of the first embodiment. The subsequent steps are the same as those of the first embodiment. The magnetic layer 18P finally becomes the two side shield layers 18. The step of forming the two side shield layers 18 of the present embodiment corresponds to the step of forming the first and second wall-face-forming parts.

In the present embodiment, the side gap length SG is determined by the thicknesses of the second layer 62 and the third layer 63. The remainder of configuration, function and effects of the present embodiment are similar to those of the first embodiment.

Third Embodiment

Figure 32:
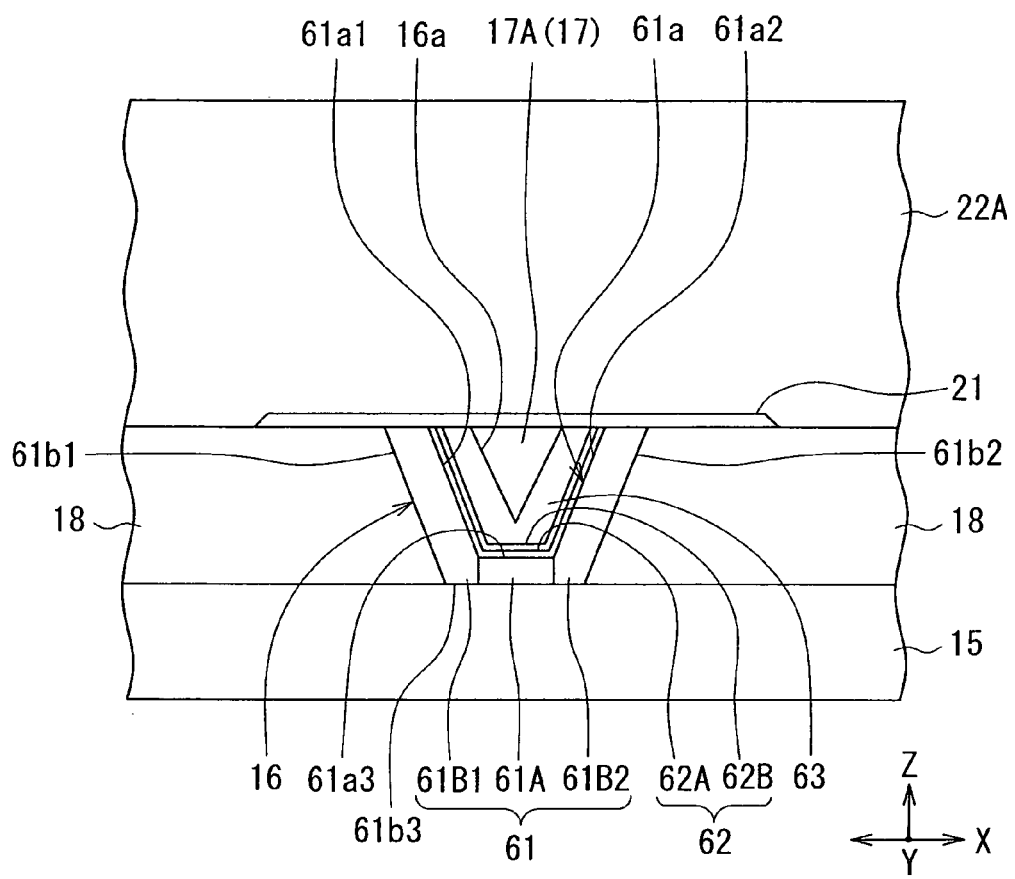
FIG. 32 is a front view showing a part of the medium facing surface of a magnetic head according to a third embodiment of the invention.

A third embodiment of the present invention will now be described. First, a description will be given of the configuration of the magnetic head according to the present embodiment with reference to FIG. 32. FIG. 32 is a front view showing a part of the medium facing surface 30 of the magnetic head according to the present embodiment. In the magnetic head according to the present embodiment, the first layer 61 of the accommodation part 16 has a bottom-forming part 61A and first and second wall-face-forming parts 61B1 and 61B2. The bottom-forming part 61A is located below the main magnetic pole 17. The bottom-forming part 61A has a bottom surface in contact with the top surface of the insulating layer 15, a top surface opposite to the bottom surface, and two side surfaces that connects the top and bottom surfaces to each other. The top surface of the bottom-forming part 61A constitutes the bottom surface 61a3. The wall-face-forming parts 61B1 and 61B2 are located on both sides of the main magnetic pole 17 opposite to each other in the track width direction (the X direction), and are connected to the two side surfaces of the bottom-forming part 61A. The wall-face-forming part 61B1 constitutes the wall face 61a1. The wall-face-forming part 61B2 constitutes the wall face 61a2. The bottom-forming part 61A and the two wall-face-forming parts 61B1 and 61B2 are each formed of an inorganic insulating material such as alumina. The thickness of each of the two wall-face-forming parts 61B1 and 61B2 may be equal to or different from the thickness of the bottom-forming part 61A.

Next, a manufacturing method for the magnetic head according to the present embodiment will be described with reference to FIG. 33 to FIG. 36. The manufacturing method for the magnetic head according to the present embodiment is the same as that for the magnetic head according to the first embodiment up to the step of removing the pattern 31 (FIG. 20). In the present embodiment, however, the first layer 61 that has been in process up to the step shown in FIG. 20 shall be a preliminary first layer. The preliminary first layer includes a portion to become the bottom-forming part 61A later and has a preliminary groove of the same shape as that of the groove 61a. In the present embodiment, the formation of the preliminary first layer is followed by the steps shown in FIG. 15A to FIG. 20, whereby the second layer 62, the third layer 63 and the magnetic layer 17P are formed in the preliminary groove. At the point when the step of FIG. 20 has been performed, the first layer 61 and the accommodation part 16 are not completed yet.

Figure 33:
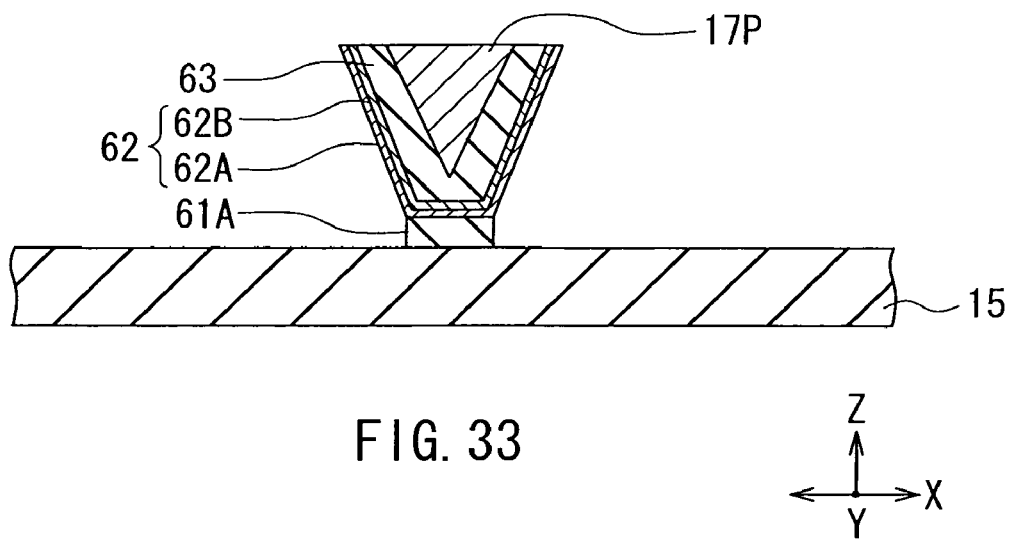
FIG. 33 is an explanatory diagram showing a step of a manufacturing method for the magnetic head according to the third embodiment of the invention.

FIG. 33 shows the next step. FIG. 33 is a cross-sectional view showing a cross section of the stack in the process of manufacturing the magnetic head, taken at the position where the medium facing surface 30 is to be formed. In this step, the preliminary first layer except the portion to become the bottom-forming part 61A is removed by ion milling, for example. The remaining portion of the preliminary first layer thus becomes the bottom-forming part 61A.

Figure 34:
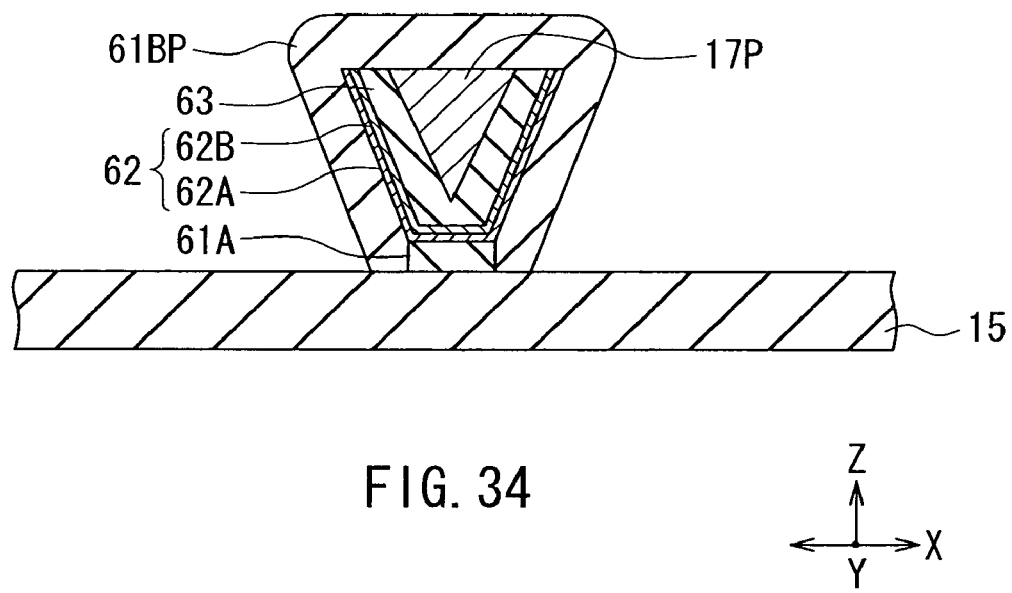
FIG. 34 is a cross-sectional view showing a step that follows the step shown in FIG. 33.

FIG. 34 shows the next step. FIG. 34 is a cross-sectional view showing a cross section of the stack in the process of manufacturing the magnetic head, taken at the position where the medium facing surface 30 is to be formed. In this step, an inorganic insulating layer 61BP is formed by, for example, sputtering or ALD, so as to cover the bottom-forming part 61A, the second layer 62, the third layer 63 and the magnetic layer 17P. The inorganic insulating layer 61BP is formed of the same material as that of the wall-face-forming parts 61B1 and 61B2.

Figure 35:
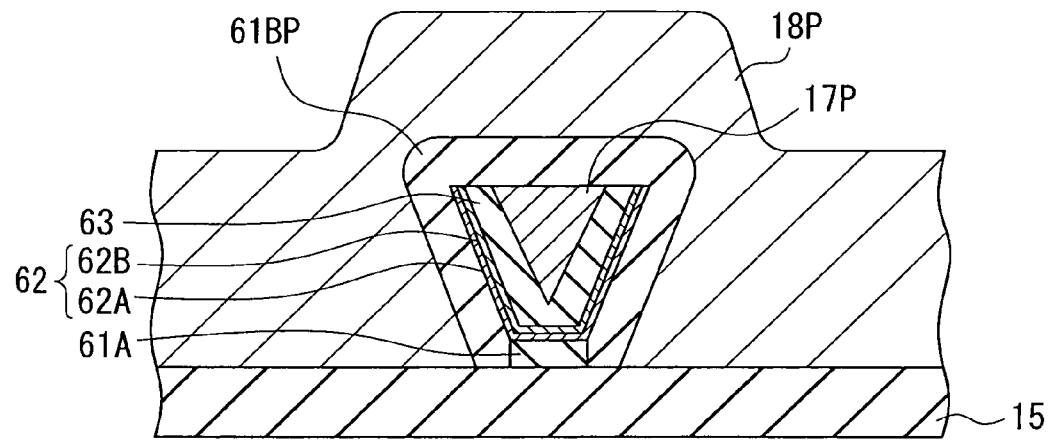
FIG. 35 is a cross-sectional view showing a step that follows the step shown in FIG. 34.

FIG. 35 shows the next step. FIG. 35 is a cross-sectional view showing a cross section of the stack in the process of manufacturing the magnetic head, taken at the position where the medium facing surface 30 is to be formed. In this step, a magnetic layer 18P is formed to cover the inorganic insulating layer 61BP by frame plating, for example. The magnetic layer 18P is to be polished and etched later into the two side shield layers 18. Next, the insulating layer 19 (see FIG. 4) is formed around the magnetic layer 18P.

Figure 36:
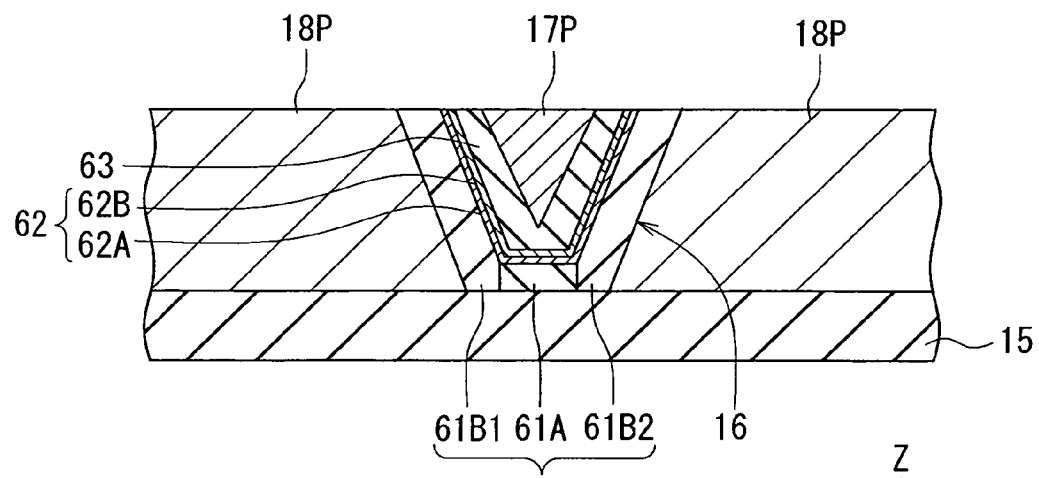
FIG. 36 is a cross-sectional view showing a step that follows the step shown in FIG. 35.

FIG. 36 shows the next step. FIG. 36 is a cross-sectional view showing a cross section of the stack in the process of manufacturing the magnetic head, taken at the position where the medium facing surface 30 is to be formed. In this step, the magnetic layer 18P, the insulating layer 19 and the inorganic insulating layer 61BP are polished by, for example, CMP, until the top surface of the magnetic layer 17P is exposed. Alternatively, the magnetic layer 18P, the insulating layer 19 and the inorganic insulating layer 61BP may be first flattened at the top by CMP and then etched by ion milling, for example, until the top surface of the magnetic layer 17P is exposed. This step makes the inorganic insulating layer 61BP into the two wall-face-forming parts 61B1 and 61B2, and thereby completes the first layer 61 and the accommodation part 16.

The subsequent steps of the present embodiment are the same as the steps of the first embodiment from the step shown in FIG. 23A and FIG. 23B.

The present embodiment allows setting the thickness of the bottom-forming part 61A, which defines the difference in level D, and the thickness of the two wall-face-forming parts 61B1 and 61B2, which pertains to the side gap length SG, independently of each other. According to the present embodiment, it is therefore possible to control the difference in level D and the side gap length SG independently of each other. This facilitates designing the magnetic head so as to suppress the adjacent track erase or wide-range adjacent track erase for improved recording density and also to improve the overwrite property.

The remainder of configuration, function and effects of the present embodiment are similar to those of the first embodiment.

Fourth Embodiment

Figure 37:
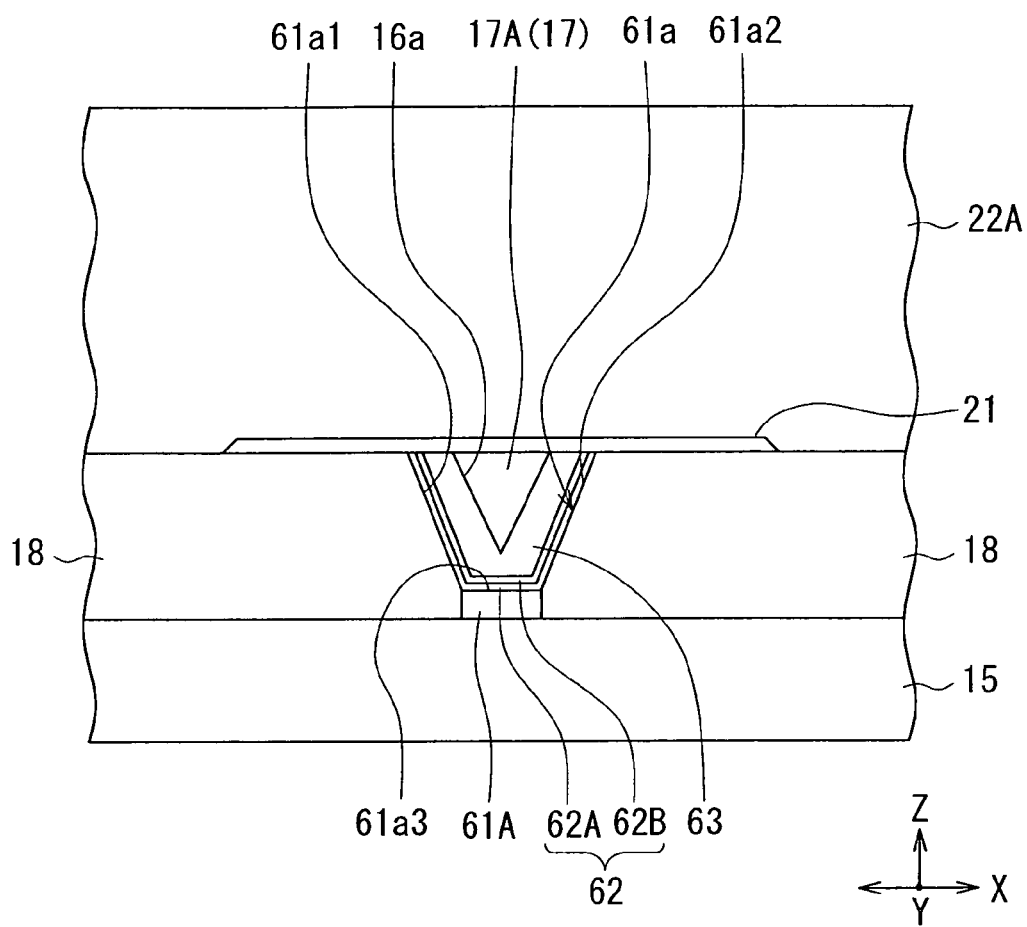
FIG. 37 is a front view showing a part of the medium facing surface of a magnetic head according to a fourth embodiment of the invention.

A fourth embodiment of the present invention will now be described with reference to FIG. 37. FIG. 37 is a front view showing a part of the medium facing surface 30 of the magnetic head according to the present embodiment. The magnetic head according to the present embodiment has the bottom-forming part 61A of the third embodiment, but does not have the first and second wall-face-forming parts 61B1 and 61B2. In the present embodiment, the groove 61a is formed by the bottom-forming part 61A and the two side shield layers 18, so that the second layer 62, the third layer 63 and the main magnetic pole 17 are accommodated in the groove 61a. In the manufacturing method for the magnetic head according to the present embodiment, a preliminary groove corresponding to the groove 61a is formed by the first layer 61 of the first embodiment, and then the second layer 62, the third layer 63 and the main magnetic pole 17 are accommodated in the preliminary groove. Then, a part of the first layer 61 is removed to form the bottom-forming part 61A, and the two side shield layers 18 are formed around the second layer 62, the third layer 63 and the main magnetic pole 17. Consequently, the groove 61a is formed by the bottom-forming part 61A and the two side shield layers 18.

In the present embodiment, the bottom-forming part 61A and the two side shield layers 18 correspond to the first layer of the accommodation part according to the present invention. The first layer of the present embodiment has the bottom-forming part 61A that forms the bottom surface 61a3 of the groove 61a of the first layer, and first and second wall-face-forming parts that respectively form the first and second wall faces 61a1 and 61a2 of the groove 61a of the first layer. The two side shield layers 18 correspond to the first and second wall-face-forming parts. Specifically, the first and second wall faces 61a1 and 61a2 are formed by the respective surfaces of the two side shield layers 18 that face toward the second layer 62, the third layer 63 and the main magnetic pole 17. The second layer 62 is formed of a metal material different from the material of each of the bottom-forming part 61A and the side shield layers 18.

The manufacturing method for the magnetic head according to the present embodiment will now be described. The manufacturing method for the magnetic head according to the present embodiment is the same as that for the magnetic head according to the third embodiment up to the step of forming the bottom-forming part 61A (FIG. 33). In the present embodiment, next, the magnetic layer 18P is formed without forming the inorganic insulating layer 61BP of the third embodiment. The subsequent steps are the same as those of the third embodiment.

In the present embodiment, the side gap length SG is determined by the thicknesses of the second layer 62 and the third layer 63. The remainder of configuration, function and effects of the present embodiment are similar to those of the third embodiment.

The present invention is not limited to the foregoing embodiments, and various modifications may be made thereto. For example, the main magnetic pole 17 of the present invention may have a flat top surface 17T without the first and second parts 17T1 and 17T2.

In each of the foregoing embodiments, the insulating layer 15 may be replaced with a shield layer made of a soft magnetic material.

While the foregoing embodiments have been described with reference to a magnetic head having a structure in which the reproducing head is formed on the base body and the recording head is stacked on the reproducing head, the reproducing head and the recording head may be stacked in the reverse order.

It is apparent that the present invention can be carried out in various forms and modifications in the light of the foregoing descriptions.

Accordingly, within the scope of the following claims and equivalents thereof, the present invention can be carried out in forms other than the foregoing most preferred embodiment.

What is claimed is:

1. A magnetic head for perpendicular magnetic recording, comprising:
    a medium facing surface that faces a recording medium;
    a coil that produces a magnetic field corresponding to data to be recorded on the recording medium;
    a main magnetic pole that has an end face located in the medium facing surface, allows a magnetic flux corresponding to the magnetic field produced by the coil to pass, and produces a recording magnetic field for recording the data on the recording medium by means of a perpendicular magnetic recording system; and
    an accommodation part having an accommodating groove that accommodates the main magnetic pole, wherein:
    the main magnetic pole includes a first part that extends from the medium facing surface to a point at a predetermined distance from the medium facing surface, and a second part that is other than the first part;
    the accommodation part includes: a first layer that has a groove; a second layer that is located in the groove of the first layer so as to lie between the first layer and the main magnetic pole; and a third layer that is located in the groove of the first layer so as to be interposed in part between the second layer and the main magnetic pole;
    the groove of the first layer has a first wall face and a second wall face that are located on both sides of the main magnetic pole opposite to each other in a track width direction, and a bottom surface that connects the first and second wall faces to each other;
    the second layer is formed of a metal material different from a material used to form the first layer, while the third layer is formed of an inorganic insulating material;
    the second layer and the third layer lie between the first layer and the first part;
    the second layer lies between the bottom surface of the groove of the first layer and the second part, but the third layer does not lie between them;
    a distance between the bottom surface of the groove of the first layer and the second part is smaller than that between the bottom surface and the first part; and
    a distance from the second part to each of the first and second wall faces of the groove of the first layer is smaller than that from the first part to each of the first and second wall faces.

2. The magnetic head for perpendicular magnetic recording according to claim 1, wherein the inorganic insulating material used to form the third layer is alumina.

3. The magnetic head for perpendicular magnetic recording according to claim 1, wherein a distance from the medium facing surface to a boundary between the first part and the second part falls within a range of 2 to 50 nm.

4. The magnetic head for perpendicular magnetic recording according to claim 1, wherein the second layer lies between the second part and each of the first and second wall faces, but the third layer does not lie between them.

5. The magnetic head for perpendicular magnetic recording according to claim 1, wherein:
    the second layer and the third layer lie between the second part and each of the first and second wall faces; and
    a portion of the third layer lying between the second part and each of the first and second wall faces has a thickness smaller than that of a portion of the third layer lying between the first part and each of the first and second wall faces.

6. The magnetic head for perpendicular magnetic recording according to claim 1, wherein the second layer is composed of a first film and a second film, the first film being in contact with the first layer, the second film being interposed between the first film and the main magnetic pole and in contact with the first film, and wherein the first film is formed of one of Ti, Cr, and Ta, while the second film is formed of one of Ru, Ni, Mo, W, Hf, and Zr.

7. The magnetic head for perpendicular magnetic recording according to claim 1, wherein a portion of the second layer lying between the main magnetic pole and each of the first and second wall faces decreases in thickness with decreasing distance to the bottom surface.

8. A head assembly comprising: a slider that is disposed to face a recording medium; and a supporter that flexibly supports the slider, the slider including the magnetic head for perpendicular magnetic recording according to claim 1.

9. A magnetic recording device comprising: a recording medium; a slider that is disposed to face the recording medium; and a positioning device that supports the slider and positions the slider with respect to the recording medium, the slider including the magnetic head for perpendicular magnetic recording according to claim 1.

10. A manufacturing method for the magnetic head for perpendicular magnetic recording according to claim 1, comprising the steps of: forming the accommodation part; forming the main magnetic pole; and forming the coil, wherein the step of forming the accommodation part includes the steps of:
    forming the first layer;
    forming the second layer;
    forming an initial third layer to cover the second layer, the initial third layer being intended to be made into the third layer later; and
    etching the initial third layer in part so as to make the initial third layer into the third layer, wherein
    in the step of etching the initial third layer in part, the second layer functions as an etching stopper for stopping the progress of etching.

11. The manufacturing method according to claim 10, wherein the inorganic insulating material used to form the third layer is alumina.

12. The manufacturing method according to claim 10, wherein the second layer has an etching rate lower than or equal to 1/5 that of the initial third layer in the step of etching the initial third layer in part.

13. The manufacturing method according to claim 10, wherein reactive ion etching is employed in the step of etching the initial third layer in part.

14. The manufacturing method according to claim 13, wherein: the inorganic insulating material used to form the third layer is alumina; the reactive ion etching uses Cl ion as its reactive gas ion; and the second layer has an etching resistance higher than that of the third layer against the Cl ion.

15. The manufacturing method according to claim 10, wherein wet etching is employed in the step of etching the initial third layer in part.

16. The manufacturing method according to claim 15, wherein: the inorganic insulating material used to form the third layer is alumina; the wet etching uses an alkaline etchant; and the second layer has an etching resistance higher than that of the third layer against the etchant.

17. The manufacturing method according to claim 10, wherein the main magnetic pole is formed by electroplating in the step of forming the main magnetic pole.

18. The manufacturing method according to claim 10, wherein a distance from the medium facing surface to a boundary between the first part and the second part falls within a range of 2 to 50 nm.

19. The manufacturing method according to claim 10, wherein the second layer lies between the second part and each of the first and second wall faces, but the third layer does not lie between them.

20. The manufacturing method according to claim 10, wherein:
    the second layer and the third layer lie between the second part and each of the first and second wall faces; and
    a portion of the third layer lying between the second part and each of the first and second wall faces has a thickness smaller than that of a portion of the third layer lying between the first part and each of the first and second wall faces.

21. The manufacturing method according to claim 10, wherein the second layer is composed of a first film and a second film, the first film being in contact with the first layer, the second film being interposed between the first film and the main magnetic pole and in contact with the first film, and wherein the first film is formed of one of Ti, Cr, and Ta, while the second film is formed of one of Ru, Ni, Mo, W, Hf, and Zr.

22. The manufacturing method according to claim 10, wherein a portion of the second layer lying between the main magnetic pole and each of the first and second wall faces decreases in thickness with decreasing distance to the bottom surface.

23. The manufacturing method according to claim 10, wherein:
    the first layer has a bottom-forming part that forms the bottom surface of the groove of the first layer, and a first wall-face-forming part and a second wall-face-forming part that respectively form the first wall face and the second wall face of the groove of the first layer;
    the step of forming the first layer includes the steps of: forming the bottom-forming part; and forming a preliminary wall-face-forming part on the bottom-forming part, the preliminary wall-face-forming part having a first preliminary wall face and a second preliminary wall face whose shapes are the same as those of the first wall face and the second wall face;
    after the formation of the preliminary wall-face-forming part, the second and third layers are formed in a space formed by the first and second preliminary wall faces and the bottom surface that is formed by the bottom-forming part; and
    the step of forming the first layer further includes the steps of: removing the preliminary wall-face-forming part after the formation of the second and third layers; and forming the first and second wall-face-forming parts after the removal of the preliminary wall-face-forming part.

24. The manufacturing method according to claim 10, wherein:
    the first layer has a bottom-forming part that forms the bottom surface of the groove of the first layer, and a first wall-face-forming part and a second wall-face-forming part that respectively form the first wall face and the second wall face of the groove of the first layer;
    the step of forming the first layer includes the step of forming a preliminary first layer that includes a portion to become the bottom-forming part later and that has a preliminary groove having a shape the same as that of the groove of the first layer;

the second and third layers are formed in the preliminary groove after the formation of the preliminary first layer; and the step of forming the first layer further includes the steps of: forming the bottom-forming part after the formation of the second and third layers, by removing the preliminary first layer except the portion to become the bottom-forming part; and forming the first and second wall-face-forming parts after the formation of the bottom-forming part.

* * * * *